(12) United States Patent
Tachiiri

(10) Patent No.: US 9,568,337 B2
(45) Date of Patent: Feb. 14, 2017

(54) ROTATION STATE DETECTION DEVICE

(71) Applicant: DENSO CORPORATION, Kariya, Aichi-pref. (JP)

(72) Inventor: Motoki Tachiiri, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/893,467

(22) PCT Filed: May 26, 2014

(86) PCT No.: PCT/JP2014/002756
§ 371 (c)(1),
(2) Date: Nov. 23, 2015

(87) PCT Pub. No.: WO2014/192278
PCT Pub. Date: Dec. 4, 2014

(65) Prior Publication Data
US 2016/0123778 A1  May 5, 2016

(30) Foreign Application Priority Data
May 31, 2013 (JP) .................. 2013-114958

(51) Int. Cl.
*G09G 5/00* (2006.01)
*G06F 3/033* (2013.01)
(Continued)

(52) U.S. Cl.
CPC ............... *G01D 5/2412* (2013.01); *G01B 7/30* (2013.01)

(58) Field of Classification Search
CPC ........ G01D 5/4212; G01D 5/2412; G01B 7/30
(Continued)

(56) References Cited

U.S. PATENT DOCUMENTS

2004/0196257 A1* 10/2004 Sato .................. G06F 3/0362
345/156
2010/0026532 A1   2/2010 Shimizu et al.

FOREIGN PATENT DOCUMENTS

JP         S61080407 U    5/1986
JP         S63052067 A    3/1988
(Continued)

OTHER PUBLICATIONS

International Search Report and Written Opinion (in Japanese with English Translation) for PCT/JP2014/002756, mailed Jul. 22, 2014; ISA/JP.

*Primary Examiner* — Farhana Hoque
(74) *Attorney, Agent, or Firm* — Harness, Dickey & Pierce, P.L.C.

(57) ABSTRACT

A rotation state detection device is applied to an operation device having a rotating body that rotates in response to an input of an operation force, and a supporting body that supports the rotating body rotatably. The rotation state detection device includes: a first electrode arranged at the rotating body; and a second electrode arranged at the supporting body and generating a capacitance with the first electrode. The first electrode and the second electrode are arranged to vary the capacitance periodically each time the rotating body rotates by a predetermined angle and make a shape of a capacitance waveform representing a change in the capacitance to be different. A rotational angle of the rotating body is calculated based on the number of periodic times the capacitance varies, and a rotational direction of the rotating body is determined based on the shape of the capacitance waveform.

9 Claims, 14 Drawing Sheets

(51) Int. Cl.
*G01D 5/241* (2006.01)
*G01B 7/30* (2006.01)

(58) Field of Classification Search
USPC .................................. 324/676; 345/156, 157
See application file for complete search history.

(56) References Cited

FOREIGN PATENT DOCUMENTS

| | | |
|---|---|---|
| JP | S63256861 A | 10/1988 |
| JP | 2001296966 A | 10/2001 |
| JP | 2004311196 A | 11/2004 |
| JP | 2005149856 A | 6/2005 |
| JP | 2010210414 A | 9/2010 |
| JP | 2010287351 A | 12/2010 |
| WO | WO-2008132930 A1 | 11/2008 |
| WO | WO-2014203513 A1 | 12/2014 |

* cited by examiner

ROTATION STATE DETECTION DEVICE

CROSS REFERENCE TO RELATED APPLICATIONS

This application is a U.S. National Phase Application under 35 U.S.C. 371 of International Application No. PCT/JP2014/002756 filed on May 26, 2014 and published in Japanese as WO 2014/192278 A1 on Dec. 4, 2014. This application is based on and claims the benefit of priority from Japanese Patent Application No. 2013-114958 filed on May 31, 2013. The entire disclosures of all of the above applications are incorporated herein by reference.

TECHNICAL FIELD

The present disclosure relates to a rotation state detection device applied to an operation device having a rotating body that rotates in response to an input of an operation force.

BACKGROUND ART

Patent Document 1 discloses an operation device including a rotating body rotationally operated by a user, a supporting body supporting the rotating body in a rotatable manner, and a detection device detecting a rotationally operated position (rotational angle) of the rotating body. The detection device detects a capacitance generated between a user's fingertip placed at a predetermined position of the rotating body and an electrode attached to the supporting body and detects a rotationally operated position of the rotating body on the basis of the detection result.

PRIOR ART LITERATURES

Patent Literature

Patent Document 1: JP 2005-149856-A

SUMMARY OF INVENTION

However, it is difficult for the detection device in the related art as above to detect whether the rotating body is rotationally operated clockwise or counterclockwise. The detection device therefore needs an improvement in overcoming such a difficulty.

In view of the foregoing, the present disclosure has an object to provide a rotation state detection device capable of detecting both of a rotational angle and a rotational direction of a rotating body.

A rotation state detection device of the present disclosure is applied to an operation device having a rotating body that rotates in response to an input of an operation force, and a supporting body that supports the rotating body in a rotatable manner.

A rotation state detection device according to one aspect of the present disclosure includes a first electrode provided to the rotating body, and a second electrode provided to the supporting body and generating a capacitance with the first electrode. The first electrode and the second electrode are provided for the capacitance to vary in cycles each time the rotating body rotates by a predetermined angle and for a shape of a capacitance waveform representing a change in the capacitance to be different when the rotating body rotates forward and backward. The rotation state detection device further includes a rotational angle calculation device for calculating a rotational angle of the rotating body on the basis of the number of times the capacitance has varied in cycles, and a rotational direction determination device for making a determination on a rotational direction of the rotating body on the basis of the shape of the capacitance waveform.

According to the configuration as above, the both electrodes are provided for a capacitance generated between the both electrodes to vary in cycles each time the rotating body rotates by a predetermined angle, and a rotational angle of the rotating body is calculated on the basis of the number of appearances of such a cyclic variance. Hence, the rotation state detection device becomes capable of detecting a rotational angle of the rotating body. Also, the both electrodes are provided for the shape of the capacitance waveform to be different when the rotating body rotates forward and backward and a rotational direction of the rotating body is determined on the basis of the shape of the capacitance waveform. Hence, the rotation state detection device becomes capable of detecting a rotational direction of the rotating body. Consequently, the rotation state detection device configured as above is capable of detecting a rotational direction as well using the first electrode and the second electrode used to detect a rotational angle.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
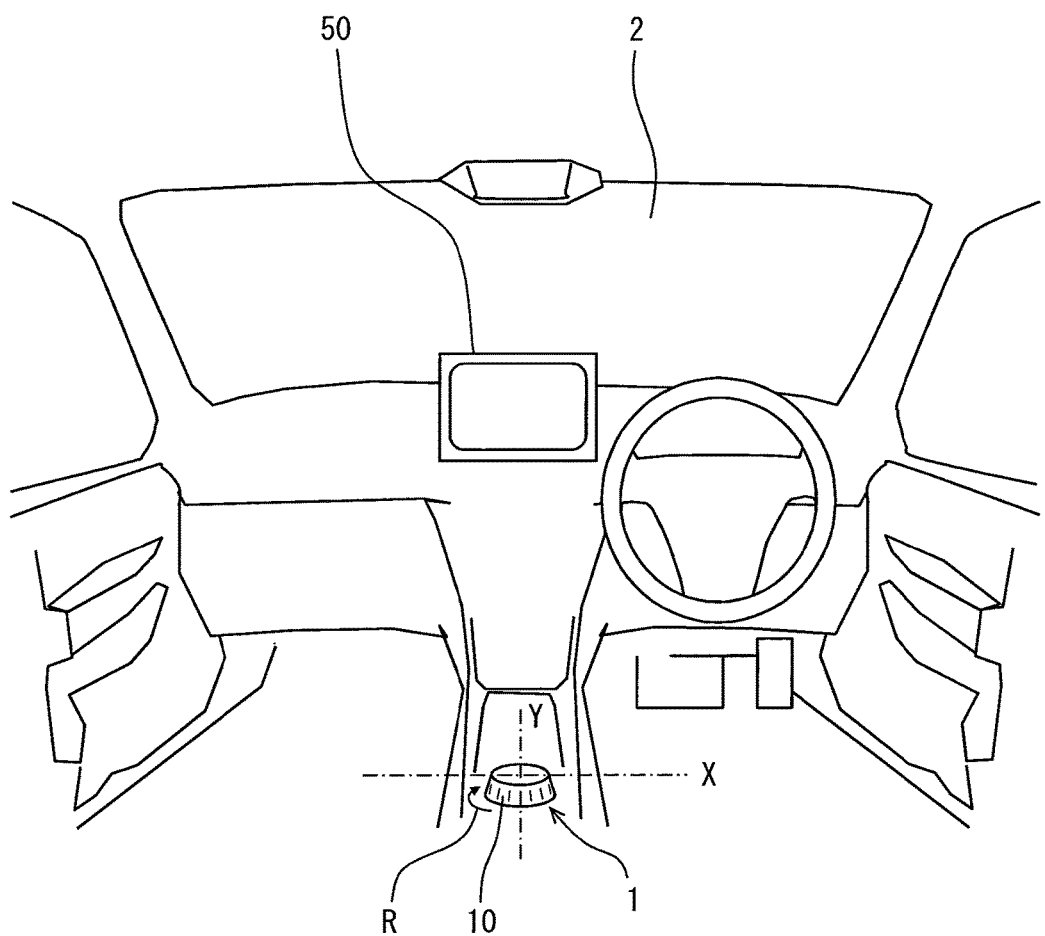
FIG. 1 is a view used to describe a location at which to arrange an operation device including a rotation state detection device in a first embodiment of the present disclosure.

Hereinafter, embodiments of the present disclosure will be described according to the drawings. In the respective embodiments below, counterparts are labeled with same reference numerals and a description is not repeated in some cases. In a case where only a part of a configuration is described in the respective embodiments, the configuration described earlier in another embodiment is applied to the rest of the configuration. Besides a combination of the configurations explicitly described in the respective embodiments, configurations of two or more embodiments can be combined partially even when not explicitly described unless a difficulty arises from the combination.

First Embodiment

A rotation state detection device of the present embodiment is applied to an operation device 1 shown in FIG. 1. The operation device 1 is disposed inside a vehicle interior and manually operated by a vehicle occupant, namely, a user. According to contents of operations by the user, the operation device 1 outputs command signals directing operation contents to various types of in-vehicle devices. Examples of the in-vehicle devices include but not limited to a navigation system 51 that gives guidance of a vehicle route, an audio system 52, an air conditioner 53 (see FIG. 2).

As is shown in FIG. 1, the operation device 1 is disposed inside the vehicle interior within the arm's reach of the vehicle driver (i.e., user). Contents operated on the operation device 1 are displayed on a display device 50. The display device 50 is disposed at a remote position from the operation device 1. Accordingly, the user is able to operate the operation device 1 without losing his posture much and is also able to visually recognize contents displayed on the display device 50 without widely deviating his sight lines from a front windshield 2.

The operation device 1 is manually operated by a user's hand and operable according to a swing operation in a vehicle right-left direction, a swing operation in a vehicle front-rear direction, and a rotation operation in a direction indicated by a capital R. In FIG. 1, an X-axis denotes a direction of the swing operation in the vehicle right-left direction and a Y-axis denotes a direction of the swing operation in the vehicle front-rear direction. Also, a Z-axis in FIG. 2 denotes a center line in a rotational direction R and extends perpendicularly to the X-axis and the Y-axis.

Figure 2:
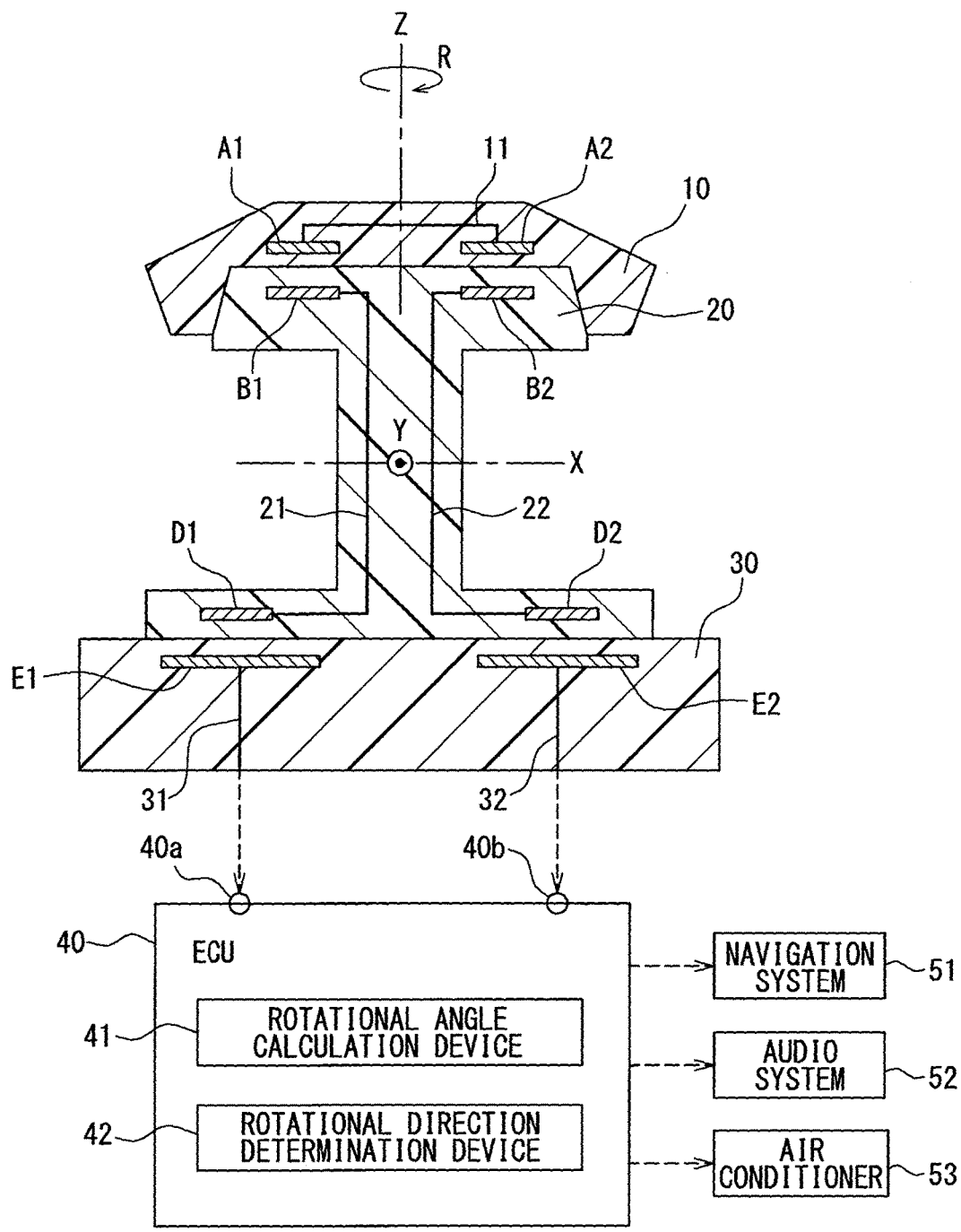
FIG. 2 is a view schematically showing a section of the operation device of the first embodiment.

As is shown in FIG. 2, the operation device 1 includes an operation knob 10, a supporting body 20, and a base member 30, all of which will be described below. The operation knob 10, which corresponds to "a rotating body" in the appended claims, is a member held by the user's hand and supported on the supporting body 20 in a rotatable manner. The user is thus able to operate the operation knob 10 to rotate in the direction R relatively with respect to the supporting body 20.

The supporting body 20 is supported on the base member 30 and allowed to slide in a direction X and a direction Y. The user is thus able to operate the operation knob 10 together with the supporting body 20 to swing in the direction X and the direction Y relatively with respect to the base member 30. The base member 30 is fixed at a predetermined position inside the vehicle interior. In short, the operation knob 10 is allowed to rotate in the direction R and swing in the direction X and also in the direction Y in response to an operation force from the user.

A pushing force toward a reference position in the rotational direction R is conferred to the operation knob 10. Accordingly, when the user moves his hand off the operation knob 10 after he operated the operation knob 10 to rotate, the operation knob 10 rotates so as to return to the reference position. Also, a pushing force toward the reference position in the swing directions X and Y is conferred to the supporting body 20. Accordingly, when the user moves his hand off the operation knob 10 after he operated the operation knob 10 together with the supporting body 20 to swing, the operation knob 10 and the supporting body 20 move so as to return to the reference position.

Figure 3:
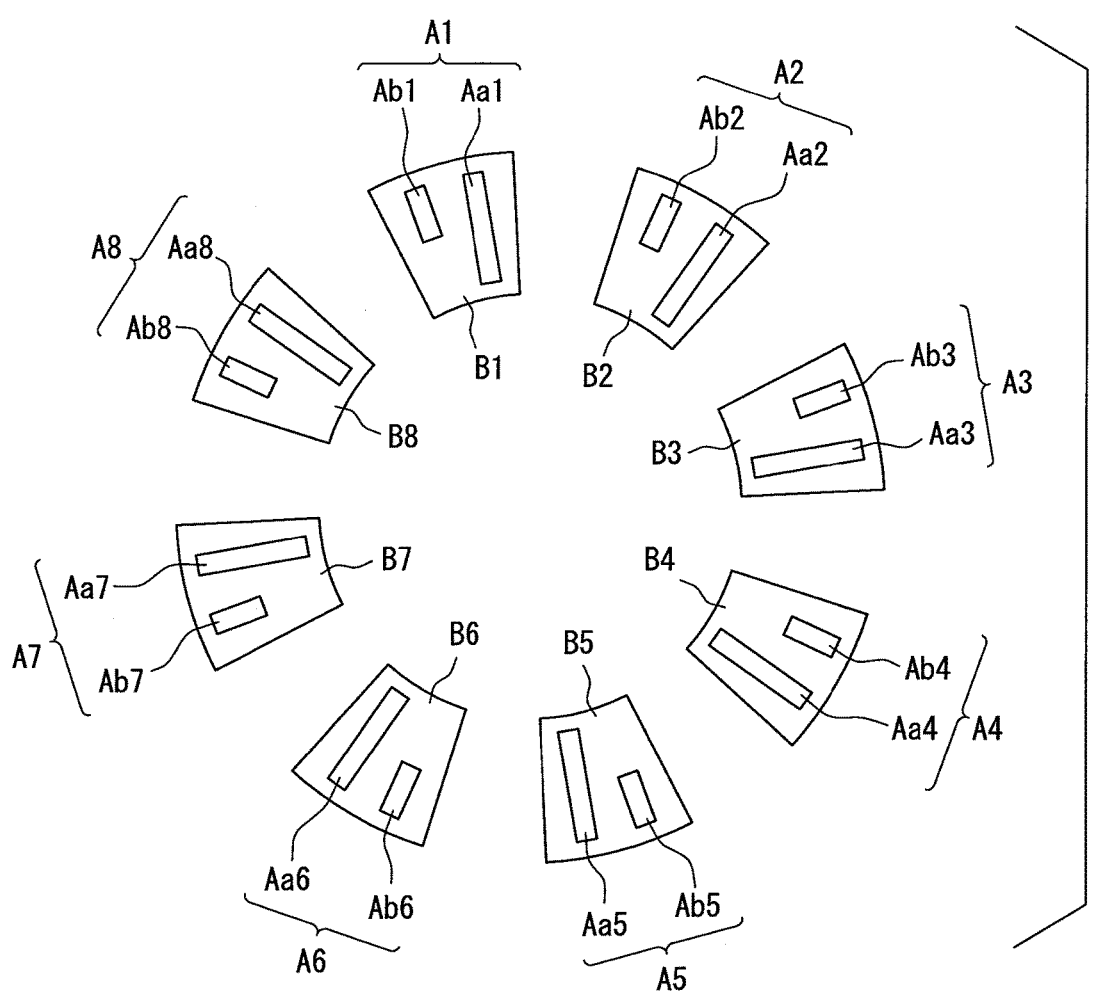
FIG. 3 is a view of first electrodes and second electrodes of the first embodiment when viewed in a Z-axis direction.

As are shown in FIG. 3 and FIG. 2, the operation knob 10 is provided with multiple first electrodes A1, A2, A3, A4, A5, A6, A7, and A8. The first electrodes A1 through A8 therefore rotate with the operation knob 10. Meanwhile, the supporting body 20 is provided with as many second electrodes B1, B2, B3, B4, B5, B6, B7, and B8 as the first electrodes A1 through A8. The first electrodes A1 through A8 and the second electrodes B1 through B8 are disposed about the Z-axis at regular intervals.

The first electrodes A1, A2, A3, A4, A5, A6, A7, and A8 have long electrodes Aa1, Aa2, Aa3, Aa4, Aa5, Aa6, Aa7, and Aa8, respectively, and short electrodes Ab1, Ab2, Ab3, Ab4, Ab5, Ab6, Ab7, and Ab8, respectively. Each long electrode and the corresponding short electrode are electrically connected. The long electrodes Aa1 through Aa8 are set to have larger areas than the short electrodes Ab1 through Ab8.

More specifically, the long electrodes Aa1 through Aa8 and the short electrodes Ab1 through Ab8 are rectangular metal plates extending in a radial direction of rotation and areas of the former and the latter are made different by making a radial length different. The long electrodes Aa1 through Aa8 and the short electrodes Ab1 through Ab8 are aligned at a predetermined interval apart in the rotational direction R.

The second electrodes B1 through B8 are fan-like metal plates when viewed in the Z-axis direction and disposed at positions at which each opposes a rotation trajectory of the first electrodes A1 through A8. Each of the second electrodes B1 through B8 is of a size large enough to include a set of the long electrode Aa1 and the short electrode Ab1 (that is, one first electrode A1) when viewed in the Z-axis direction.

The respective first electrodes A1 through A8 and the respective second electrodes B1 through B8 form capacitors C1, C2, C3, C4, C5, C6, C7, and C8 which generate capacitances between the former and the latter. The capacitances reach a maximum when the entire first electrodes A1 through A8 are positioned within a projection range of the second electrodes B1 through B8 as shown in FIG. 3.

Figure 4:
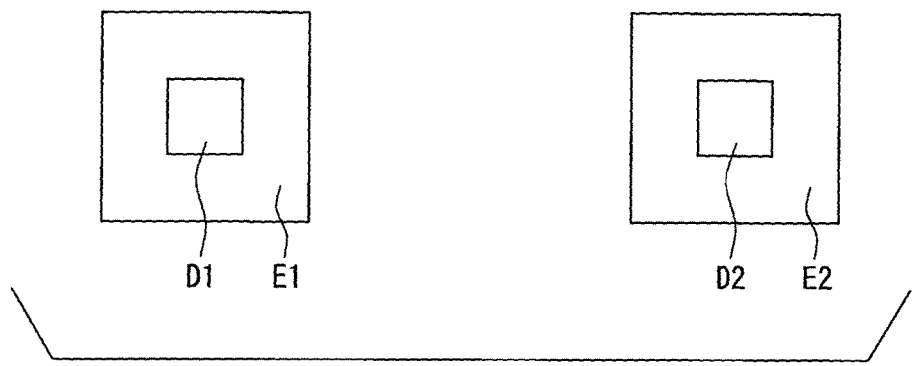
FIG. 4 is a view of third electrodes and fourth electrodes of the first embodiment when viewed in the Z-axis direction.

As are shown in FIG. 4 and FIG. 2, the supporting body 20 is provided with two third electrodes D1 and D2. The base member 30 is provided with fourth electrodes E1 and E2 in portions opposing the third electrodes D1 and D2. The respective third electrodes D1 and D2 and the respective fourth electrodes E1 and E2 form capacitors C9 and C10 which generate capacitances between the former and the latter.

Each of the fourth electrodes E1 and E2 is of a size large enough to include one third electrode D1 or D2 when viewed in the Z-axis direction. The fourth electrodes E1 and E2 are formed to have a sufficiently large area in comparison with the third electrodes D1 and D2 for the entire third electrodes D1 and D2 to be positioned within a projection range of the fourth electrodes E1 and E2 even when the supporting body 20 fully swings in the direction X and the direction Y.

Figure 5:
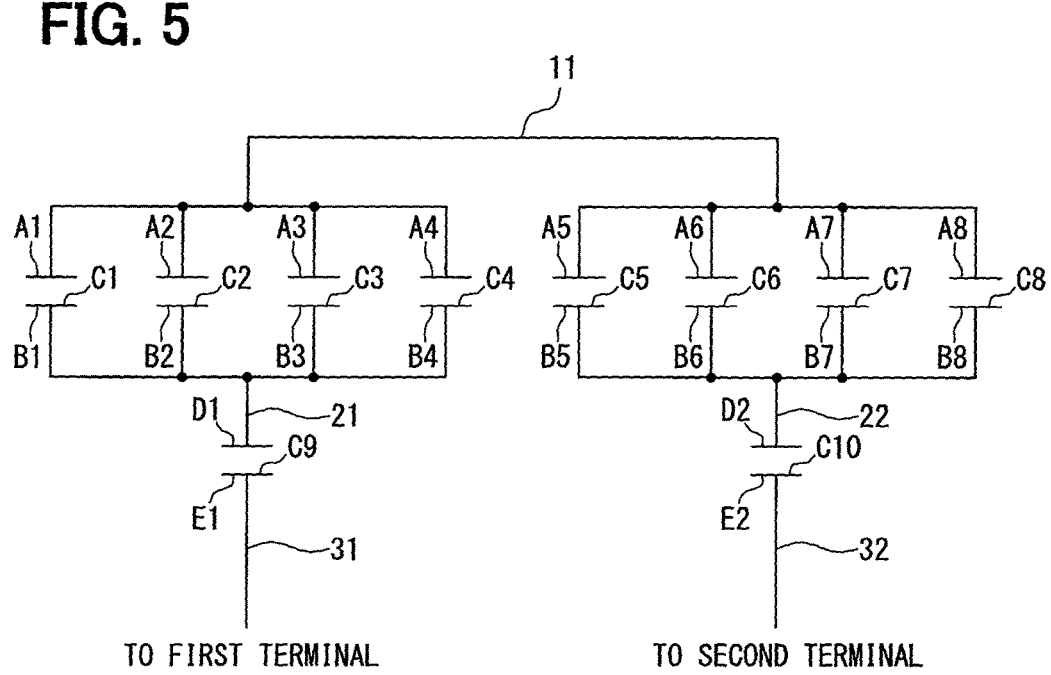
FIG. 5 is an equivalent circuit diagram showing a connection state of capacitors formed by the respective electrodes in the first embodiment.

As is shown in FIG. 5, the capacitors C1 through C10 are electrically interconnected. More specifically, the multiple first electrodes A1 through A8 and the multiple second electrodes B1 through B8 are divided to a first group and a second group. In the description below, the capacitors C1 through C4 formed of the first electrodes A1 through A4 and the second electrodes B1 through B4 belonging to the first group are referred to as the first capacitors. The capacitors C5 through C8 formed of the first electrodes A5 through A8 and the second electrodes B5 through B8 belonging to the second group are referred to as the second capacitors.

Herein, of the multiple first electrodes A1 through A8, the first electrodes forming the capacitors with the second electrodes B1 through B4 belonging to the first group belong to the first group and the first electrodes forming the capacitors with the second electrodes B5 through B8 belonging to the second group belong to the second group. Hence, it should be noted that to which group each of the first electrodes A1 through A8 belongs is changing as the operation knob 10 rotates.

The respective first capacitors C1 through C4 are connected in parallel and the respective second capacitors C5 through C8 are also connected in parallel. The capacitor C9 and the first capacitors C1 through C4 are connected on the side of the third electrode D1 and on the side of the second electrodes B1 through B4, respectively. The capacitor C10 and the second capacitors C5 through C8 are connected on the side of the third electrode D2 and on the side of the second electrodes B5 through B8, respectively. The first capacitors C1 through C4 and the second capacitors C5 through C8 are connected on the side of the first electrodes A1 through A4 and on the side of the first electrodes A5 through A8, respectively.

In short, the capacitor C9, the first capacitors C1 through C4, the second capacitors C5 through C8, and the capacitor C10 are connected in series in order of description. In the description below, a synthetic capacitance of all the capacitors C1 through C10 is referred to as the capacitance Ctr. Because the multiple first electrodes A1 through A8 are electrically interconnected, the circuit shown in FIG. 5 remains the same even when the first electrodes A1 through A8 change the groups to which each belongs. In other words, the synthetic capacitance (i.e., capacitance Ctr) of the capacitors C1 through C10 does not vary with a change as to which of the first electrodes A1 through A8 belongs to which group.

On the side of the fourth electrode E1, the capacitor C9 is connected to a first terminal 40a of an electronic control unit (i.e., ECU 40) and the capacitor C10 is connected to a second terminal 40b of the ECU 40 on the side of the second electrode E2. Accordingly, the ECU 40 becomes capable of calculating the capacitance Ctr, which is a synthetic capacitance of the capacitors C1 through C10, on the basis of information on the both terminals 40a and 40b. A specific example of the calculation will be described in the following.

For example, one ends of the both terminals 40a and 40b are grounded and a predetermined voltage is applied to the other ends. The ECU 40 measures a time required since the voltage application starts until a current flowing at the other ends reaches a predetermined value. The required time becomes longer as the capacitance Ctr increases. Hence, the ECU 40 calculates the capacitance Ctr on the basis of the measured required time.

Alternatively, one ends of the both terminals 40a and 40b are grounded and a predetermined current is passed to the other ends. Potential differences at the both terminals 40a and 40b vary with the capacitance Ctr. Hence, the ECU 40 detects the potential differences at the both terminals 40a and 40b and calculates the capacitance Ctr on the basis of the detected potential differences.

When the operation knob 10 is operated to rotate, the first electrodes A1 through A8 rotate. Accordingly, areas of the first electrodes A1 through A8 vary in portions opposing the second electrodes B1 through B8. Consequently, capacitances of the respective capacitors C1 through C8 vary and hence the capacitance Ctr as a total varies, too.

In view of the foregoing, the ECU 40 calculates the capacitance Ctr in the manner described above, and calculates an amount of the rotation operation and a rotational direction of the operation knob 10 on the basis of a change in the calculated capacitance Ctr. An unillustrated displacement sensor that detects an amount of movement of the supporting body 20 in the direction X and the direction Y is attached to the base member 30. The ECU 40 calculates an amount of the swing operation in the direction X and the direction Y and a direction of the swing operation on the operation knob 10 on the basis of the detection result of the displacement sensor. Signals indicating an amount of the rotation operation, a rotational direction, an amount of the swing operation, and a direction of swing calculated as above correspond to the command signals described above.

Numerals 11, 21, 22, 31, and 32 of FIG. 2 denote metal pieces electrically connecting the respective electrodes, and correspond, respectively, to numerals 11, 21, 22, 31, and 32 in a circuit of FIG. 5. The metal pieces 11, 21, 22, 31, and 32 are fit inside the operation knob 10, the supporting body 20, and the base member 30, all of which are made of resin.

A method by which the ECU 40 calculates an amount of the rotation operation and a rotational direction will now be described in detail. The ECU 40 has a microcomputer. Various types of calculations as above are made by computation processing of the microcomputer.

Figure 6:
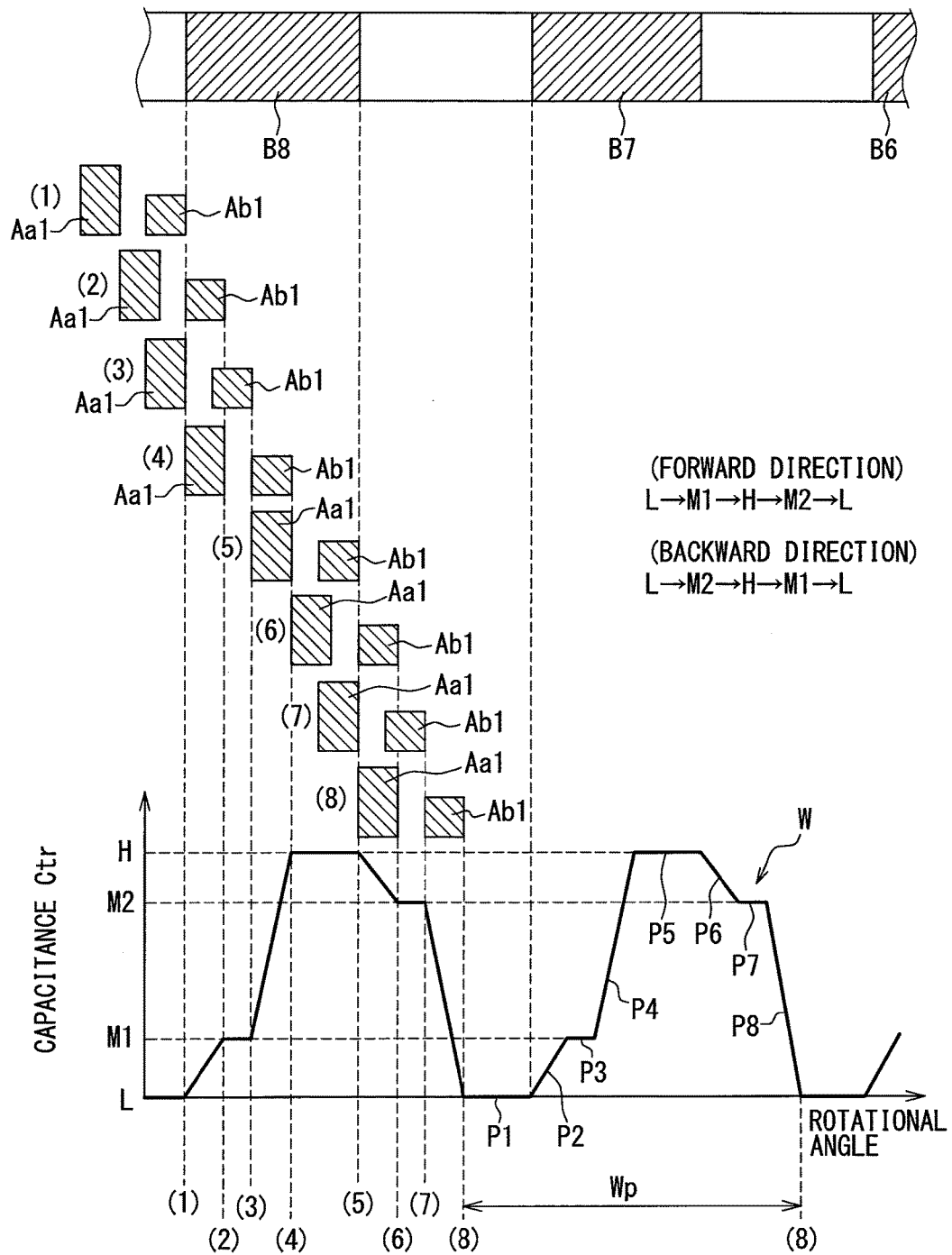
FIG. 6 is a view schematically showing a positional relation between the first electrode and the second electrode and a capacitance waveform corresponding to the positional relation in the first embodiment.

FIG. 6 shows a positional relation among the long electrode Aa1 and the short electrode Ab1 of the first electrode A1 and the second electrode B8 when the first electrodes A1 through A8 shown in FIG. 3 rotate in a counterclockwise direction (hereinafter, referred to as the forward direction). As the long electrode Aa1 and the short electrode Ab1 move in order of (1) through (8), the capacitance Ctr varies as shown in a bottom row of FIG. 6. That is to say, a capacitance waveform W shown in the bottom row of FIG. 6 is a waveform representing a change in the capacitance Ctr corresponding to a rotational angle of the operation knob 10.

A description will now be given to the positional relation among the long electrode Aa1, the short electrode Ab1, and the second electrode B8 in the states (1) through (8) while the operation knob 10 rotates in the forward direction and to the capacitance Ctr corresponding to the positional relation. The same applies to relations between the other first electrodes A2 through A8 and the other second electrodes B1 and B7 and a description is omitted herein.

In the state (1), neither the long electrode Aa1 nor the short electrode Ab1 is in a region (hereinafter, referred to as the second region) opposing the second electrode B8. Hence, the capacitance Ctr is at a minimum value (i.e., lowest value L). When the operation knob 10 in the state (1) rotates in the forward direction, the short electrode Ab1 makes an entry into the second region and an entry area increases gradually. When the short electrode Ab1 is fully in the second region as in the state (2), the capacitance Ctr increases to a first intermediate value M1.

The capacitance Ctr remains invariant and is maintained at a constant value (i.e., first intermediate value M1) as in the state (3) even when the operation knob 10 rotates in the forward direction until the long electrode Aa1 starts making an entry into the second region. When the operation knob 10 in the state (3) rotates further in the forward direction, the long electrode Aa1 starts making an entry into the second region and an entry area increases gradually. When the long electrode Aa1 is fully in the second region as in the state (4), the capacitance Ctr reaches a maximum value (i.e., highest value H).

The capacitance Ctr remains invariant and is maintained at a constant value (i.e., highest value H) as in the state (5) even when the operation knob 10 rotates until the short electrode Ab1 starts making an exit from the second region. When the operation knob 10 in the state (5) rotates further in the forward direction, the short electrode Ab1 starts making an exit from the second region and the entry area of the short electrode Ab1 decreases gradually. When the entire short electrode Ab1 leaves from the second region as in the state (6), the capacitance Ctr decreases to a second intermediate value M2. The second intermediate value M2 is set to a value different from the first intermediate value M1.

The capacitance Ctr remains invariant and is maintained at a constant value (i.e., second intermediate value M2) as in the state (7) even when the operation knob 10 rotates in the forward direction until the long electrode Aa1 starts making an exit from the second region. When the operation knob 10 in the state (7) rotates further in the forward direction, the long electrode Aa1 starts making an exit from the second region and the entry area of the long electrode Aa1 decreases gradually. When the entire long electrode Aa1 leaves from the second region as in the state (8), the capacitance Ctr decreases to the minimum value (i.e., lowest value L).

When the positional relation among the long electrode Aa1, the short electrode Ab1, and the second electrode B8 changes in order of (1) to (8) in the manner described above as the operation knob 10 rotates in the forward direction, the capacitance Ctr varies as follows. That is, the capacitance Ctr increases to the first intermediate value M1 after maintained at the lowest value L, and increases to the highest value H after maintained at the first intermediate value M1. Subsequently, the capacitance Ctr decreases to the second intermediate value M2 after maintained at the highest value H and decreases to the lowest value L after maintained at the second intermediate value M2.

Hence, a pulsating waveform Wp, which increases from the lowest value L to the highest value H and decreases again to the lowest value L, appears in the capacitance waveform W each time any of the multiple first electrodes A1 through A8 passes across the multiple second electrodes B1 through B8. Also, invariant portions P1, P3, P5, and P7, during which the capacitance Ctr is maintained at four types of different constant values (i.e., lowest value L, first intermediate value M1, highest value H, and second intermediate value M2, respectively), appear in a single pulsating waveform Wp. Of the pulsating waveform Wp, portions during which the capacitance Ctr increases or decreases between adjacent two of the invariant portions P1, P3, P5, and P7 are referred to as variant portions P2, P4, P6, and P8.

When the operation knob 10 rotates in the forward direction, the positional relation changes in order of (1) to (8) and the four types of the constant values contained in the capacitance waveform W repeatedly appear in order of the lowest value L, the first intermediate value M1, the highest value H, the second intermediate value M2, and the lowest value L. On the other hand, when the operation knob 10 rotates in a backward direction, the positional relation changes in order of (8) to (1) and the four types of the constant values contained in the capacitance waveform W repeatedly appear in order of the lowest value L, the second intermediate value M2, the highest value H, the first intermediate value M1, and the lowest value L.

As has been described above, the microcomputer in the ECU 40 calculates the capacitance Ctr. By making the calculation repetitively in predetermined cycles (for example, computation cycles of the microcomputer), the microcomputer obtains the capacitance waveform W. The microcomputer determines whether the invariant portions P1, P3, P5, and P7 are appearing in the obtained capacitance waveform W.

For example, when the calculated capacitance Ctr is at a value within a capacitance range of predetermined amplitude having the first intermediate value M1 as a central value for a predetermined time t1 or longer, the microcomputer determines that the first intermediate value M1 is appearing. However, when the capacitance Ctr remains invariant for a predetermined time t2 (i.e., t2>t1) or longer, the microcomputer determines that the operation knob 10 is not rotating.

When the microcomputer determines that the invariant portions P1, P3, P5, and P7 are appearing, the microcomputer counts the number of the appearing pulsating waveforms Wp. For example, the microcomputer counts the pulsating waveforms Wp by assuming that the number of appearances of the invariant portion P1 corresponding to the lowest value L is the number of appearances of the pulsating waveforms Wp. The microcomputer calculates an amount of the rotation operation on the operation knob 10 on the basis of the count number. The microcomputer calculating an amount of the rotation operation as above functions as a rotational angle calculation device 41 shown in FIG. 2.

The microcomputer further determines an order in which the four types of the invariant portions P1, P3, P5, and P7 appear on the basis of a result of the determination on appearances of the invariant portions P1, P3, P5, and P7 as described above. When the determined order is the order of the lowest value L, the first intermediate value M1, the highest value H, the second intermediate value M2, and the lowest value L, the microcomputer determines that the operation knob 10 is rotating in the forward direction. On the other hand, when the determined order is the order of the lowest value L, the second intermediate value M2, the highest value H, the first intermediate value M1, and the lowest value L, the microcomputer determines that the operation knob 10 is rotating in the backward direction. The microcomputer making a determination on a rotational direction as above functions as rotational direction determination device 42 shown in FIG. 2.

The present embodiment described above has the characteristics as follows. Owing to the respective characteristics, advantageous effects described below can be achieved.

<First Characteristic>

The rotation state detection device of the present embodiment is provided with the first electrodes A1 through A8 and the second electrodes B1 through B8 for the capacitance Ctr to vary in cycles each time the operation knob 10 rotates by a predetermined angle. Further, the first electrodes A1 through A8 and the second electrodes B1 through B8 are provided for the shape of the capacitance waveform W to be different when the operation knob 10 rotates in the forward direction and in the backward direction. The rotation state detection device also includes the rotational angle calculation device 41 for calculating a rotational angle (i.e., amount of the rotation operation) of the operation knob 10 on the basis of the number of times the capacitance Ctr has varied in cycles (i.e., the number of appearances of the pulsating waveform Wp). The rotation state detection device further includes the rotational direction determination device 42 for making a determination on a rotational direction of the operation knob 10 on the basis of the shape of the capacitance waveform W.

Accordingly, the rotation state detection device is capable of detecting a rotational direction as well using the first electrodes A1 through A8 and the second electrodes B1 through B8 used to detect a rotational angle. In short, the rotation state detection device is capable of detecting a rotational direction using a hardware configuration necessary to detect an amount of the rotation operation.

<Second Characteristic>

The rotation state detection device of the present embodiment is also configured in such a manner that the multiple first electrodes A1 through A8 and the multiple second electrodes B1 through B8 are aligned in the rotational direction of the operation knob 10. Accordingly, the pulsating waveform Wp appears at least two times while the operation knob 10 rotates once. Hence, the rotational angle calculation device 41 becomes capable of calculating the rotational angle at a higher resolution.

<Third Characteristic>

The rotation state detection device of the present embodiment is also configured in such a manner that the first capacitors C1 through C4 and the second capacitors C5 through C8 are connected in series, and a change in the synthetic capacitance of all the capacitors C1 through C8 is used as the capacitance waveform W to determine a rotational direction.

The configuration as above can eliminate the need to electrically connect the first capacitors C1 through C4 and the second capacitors C5 through C8 to the ECU 40 on the side of the first electrodes A1 through A8. A portion that needs an electrical connection between the rotatable operation knob 10 and the supporting body 20 that supports the operation knob 10 can be eliminated. Hence, the electrical connection configuration can be simpler because a configuration to electrically connect the metal pieces 11 connected to the first electrodes A1 through A8 to the other metal pieces provided to the supporting body 20 by sliding can be omitted.

<Fourth Characteristic>

The rotation state detection device of the present embodiment is configured in such a manner that the capacitance waveform W contains at least three types of the invariant portions P1, P3, P5, and P7 and that the rotational direction determination device 42 determines a rotational direction on the basis of an order in which the invariant portions P1, P3, P5, and P7 appear.

According to the configuration as above, the shape of the capacitance waveform W is made different when the operation knob 10 rotates forward and backward, and a rotational direction is determined on the basis of a difference of the shapes. Herein, appearances of the invariant portions P1, P3, P5, and P7 are determined and a difference of the shapes can be determined on the basis of the appearance order. Hence, in comparison with a case where a difference of the shapes is determined by calculating an inclination of the capacitance waveform W, not only can a processing load required for the determination be lessened, but also determination accuracy can be improved.

<Fifth Characteristic>

Further, the rotation state detection device of the present embodiment has the first electrodes A1 through A8 which are formed by electrically connecting two types of electrodes having different areas, more specifically, by electrically connecting the long electrodes Aa1 through Aa8 and the short electrodes Ab1 through Ab8, respectively. The two types of the electrodes Aa1 through Aa8 and Ab1 through Ab8 are aligned at a predetermined interval apart in the rotational direction. When configured as above, the configuration to contain at least three types of the invariant portions P1, P3, P5, and P7 in the capacitance waveform W can be readily achieved using a simple configuration.

<Sixth Characteristic>

In the present embodiment, the operation device 1 includes the base member 30 that holds the supporting body 20 in a movable manner. The rotation state detection device of the present embodiment includes the multiple third electrodes D1 and D2 provided to the supporting body 20 and the multiple fourth electrodes E1 and E2 provided to the base member 30.

Signals indicating the capacitance waveform outputted from the second electrodes B1 through B8 are inputted into the third electrodes D1 and D2. In other words, potentials at the third electrodes D1 and D2 vary with a change in the synthetic capacitance of the capacitors C1 through C8. The fourth electrodes E1 and E2 generate capacitances with the multiple third electrodes D1 and D2. In other words, potentials at the fourth electrodes E1 and E2 vary with a change in the synthetic capacitance of the capacitors C1 through C8. The rotational direction determination device 42 determines a rotational direction of the operation knob 10 on the basis of the signals outputted from the fourth electrodes E1 and E2.

The configuration as above can eliminate the need to electrically connect the capacitors C9 and C10 to the ECU 40 on the side of the third electrodes D1 and D2. Accordingly, a portion that needs an electrical connection between the movable supporting body 20 and the base member 30 that holds the supporting body 20 can be eliminated. Hence, the electrical connection configuration can be simpler because a configuration to electrically connect the metal pieces 21 and 22 connected, respectively, to the third electrodes D1 and D2 to the other immovable metal pieces by sliding can be omitted.

<Seventh Characteristic>

In the present embodiment, all of the multiple first capacitors C1 through C4 are connected in parallel and all of the multiple second capacitors C5 through C8 are connected in parallel. Hence, the highest value H of the capacitance Ctr, which is a synthetic capacitance, can be increased. Accordingly, the multiple types of the constant values (i.e., lowest value L, first intermediate value M1, highest value H, and second intermediate value M2) can be made different noticeably from one another. Consequently, when a determination is made as to whether the invariant portions P1, P3, P5, and P7 are appearing in the capacitance waveform W, determination accuracy can be improved.

Second Embodiment

In the first embodiment above, the first capacitors C1 through C4 and the second capacitors C5 through C8 are connected in series. On the contrary, first capacitors C1 through C4 and second capacitors C5 through C8 are connected in parallel in the present embodiment.

Figure 7:
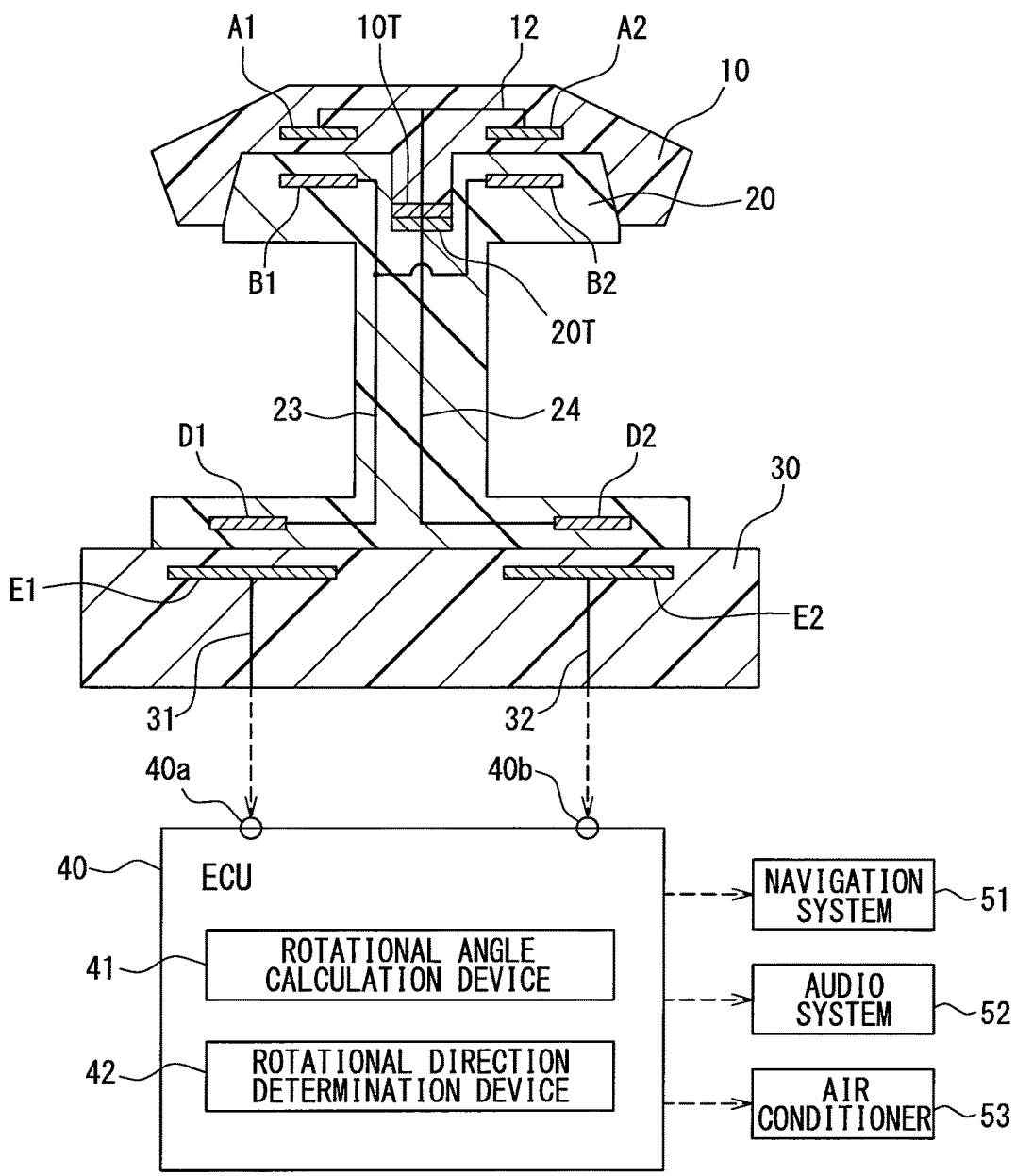
FIG. 7 is a view schematically showing a section of an operation device according to a second embodiment of the present disclosure.
Figure 8:
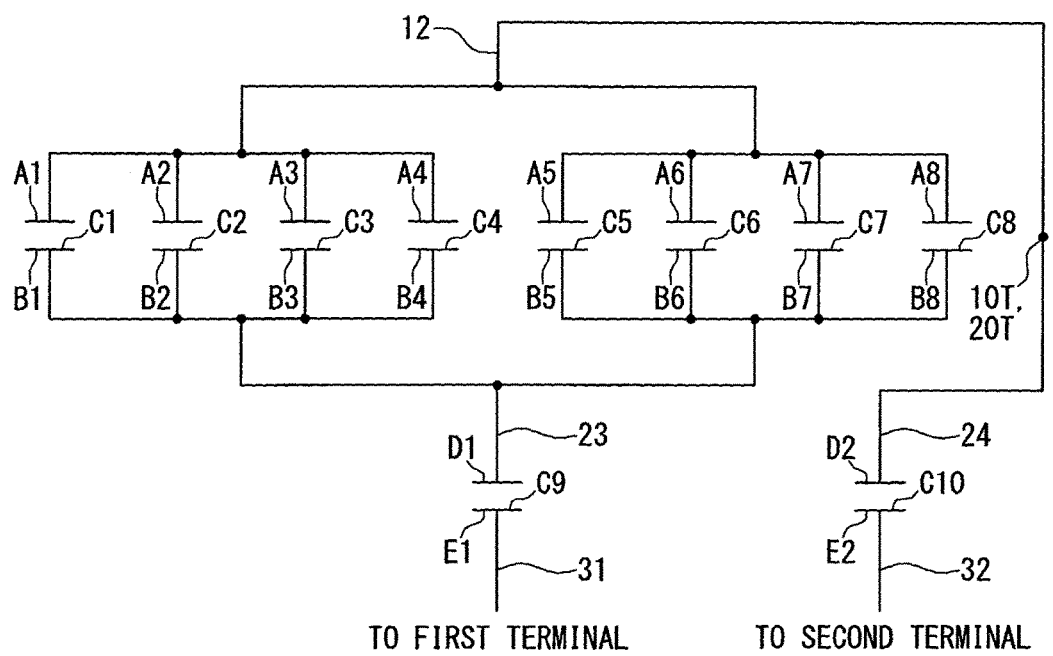
FIG. 8 is an equivalent circuit diagram showing a connection state of capacitors formed by respective electrodes in the second embodiment.

A rotation state detection device of the present embodiment will now be described in detail using FIG. 7 and FIG. 8. As is shown in FIG. 7, positions at which to provide first electrodes A1 through A8, second electrodes B1 through B8, third electrodes D1 and D2, and fourth electrodes E1 and E2 are same as the positions in the first embodiment above shown in FIG. 2. However, because the first capacitors C1 through C4 and the second capacitors C5 through C8 are electrically connected in parallel as shown in FIG. 8, it becomes necessary to connect the first electrodes A1 through A8 to the third electrode D2.

Accordingly, as is shown in FIG. 7, a rotating terminal 10T is fixed to an operation knob 10 and a fixed terminal 20T in contact with the rotating terminal 10T is fixed to a supporting body 20. When the operation knob 10 rotates, the rotating terminal 10T rotates with the operation knob 10 while making contact with the fixed terminal 20T. More specifically, the rotating terminal 10T and the fixed terminal 20T are disposed on the Z-axis and make contact in a thrust direction. By providing the terminals 10T and 20T that slide on each other as above, the parallel connection configuration of the first capacitors C1 through C4 and the second capacitors C5 through C8 can be achieved.

Of the multiple first electrodes A1 through A8, the first electrodes forming capacitors with the second electrodes B1 through B4 belonging to a first group belong to the first group, and the first electrodes forming capacitors with the second electrodes B5 through B8 belonging to a second group belong to the second group. Hence, to which group each of the first electrodes A1 through A8 belongs is changing as the operation knob 10 rotates. Because the multiple first electrodes A1 through A8 are electrically interconnected, the circuit shown in FIG. 8 remains the same even when the first electrodes A1 through A8 change the groups to which each belongs. In other words, a synthetic capacitance (i.e., capacitance Ctr) of capacitors C1 through C10 does not vary with a change as to which of the first electrodes A1 through A8 belongs to which group.

As has been described, the rotation state detection device of the present embodiment is configured in such a manner that the first capacitors C1 through C4 and the second capacitors C5 through C8 are connected in parallel and that a change in the synthetic capacitance of the capacitors C1 through C8 is used as a capacitance waveform W to determine a rotational direction.

Owing to the configuration as above, in comparison with the case of FIG. 5 where the first capacitors C1 through C4 and the second capacitors C5 through C8 are connected in series, a highest value H of the capacitance Ctr, which is a synthetic capacitance, can be increased. Accordingly, the multiple types of the constant values (i.e., lowest value L, first intermediate value M1, highest value H, and second intermediate value M2) can be made different noticeably from one another. Consequently, when a determination is made as to whether the invariant portions P1, P3, P5, and P7 are appearing in a capacitance waveform W, determination accuracy can be improved.

Third Embodiment

The first electrodes A1 through A8 of the first embodiment above are formed by electrically connecting two types of electrodes, more specifically, by electrically connecting the long electrodes Aa1 through Aa8 and the short electrodes Ab1 through Ab8, respectively. On the contrary, each of first electrodes of the present embodiment is formed of a single electrode plate and formed in a shape having a long electrode portion Ac1 and a short electrode portion Ad1. In a radial rotational direction of an operation knob 10, the long electrode portion Ac1 is longer than the short electrode portion Ad1.

Figure 9:
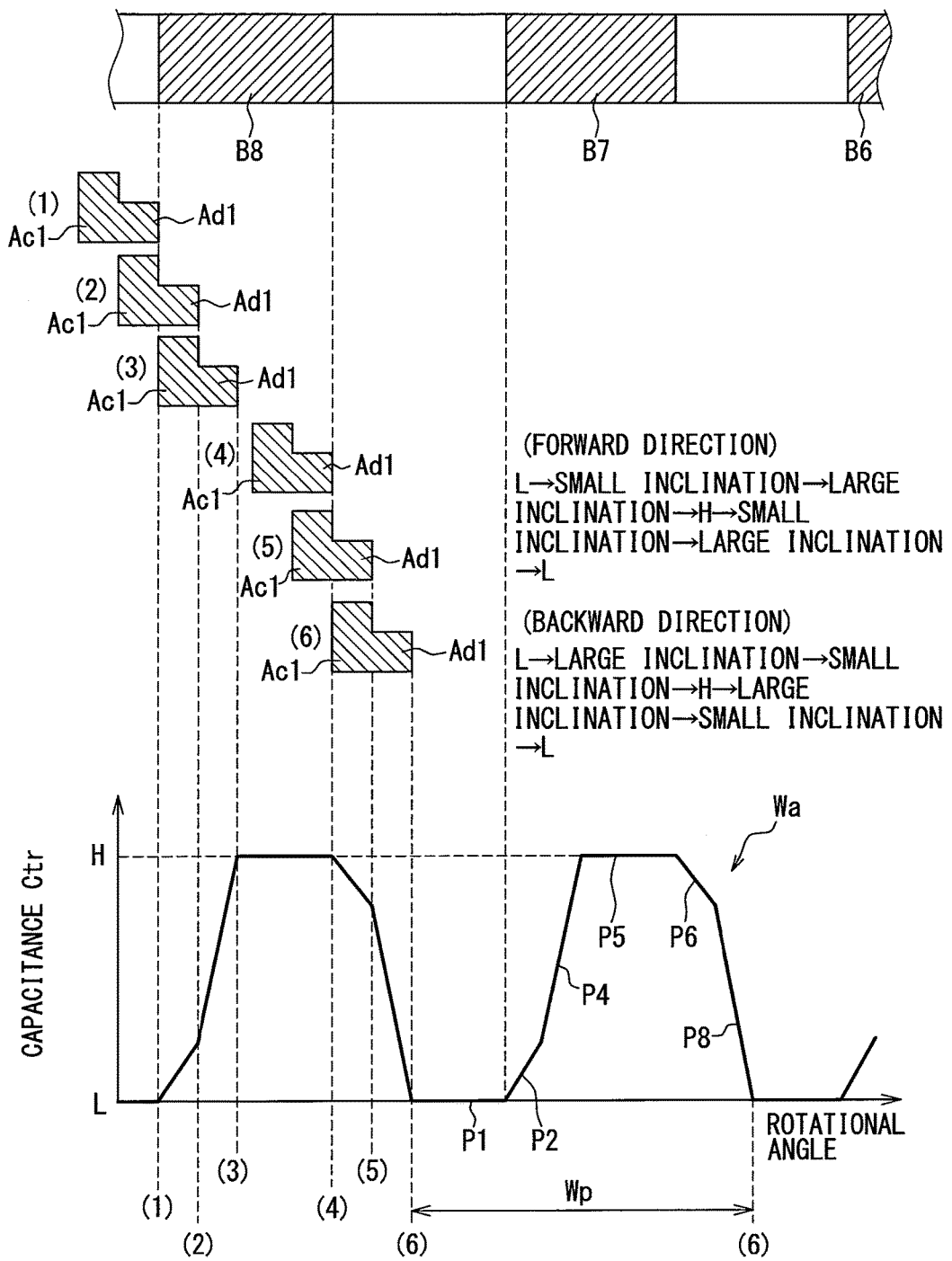
FIG. 9 is a view schematically showing a positional relation between a first electrode and a second electrode and a capacitance waveform corresponding to the positional relation in a third embodiment of the present disclosure.

FIG. 9 shows a positional relation among the long electrode portion Ac1 and the short electrode portion Ad1 of the first electrode and a second electrode B8. As the long electrode portion Ac1 and the short electrode portion Ad1 move in order of (1) to (6), the capacitance Ctr varies as shown in a bottom row of FIG. 9. In other words, a capacitance waveform Wa shown in the bottom row of FIG. 9 is a waveform representing a change in the capacitance Ctr corresponding to a rotational angle of the operation knob 10.

Hereinafter, a description will be given to the positional relation among the long electrode portion Ac1, the short electrode portion Ad1, and the second electrode B8 in the states (1) through (6) while the operation knob 10 rotates in a forward direction and to the capacitance Ctr corresponding to the positional relation.

In the state (1), neither the long electrode portion Ac1 nor the short electrode portion Ad1 is in a second region. Hence, the capacitance Ctr is at a lowest value L. When the operation knob 10 in the state (1) rotates in the forward direction, the short electrode portion Ad1 makes an entry into the second region and an entry area increases gradually. When the short electrode portion Ad1 is fully in the second region as in the state (2), the capacitance Ctr increases to a first intermediate value M1. An increase of the capacitance Ctr due to an amount of entry of the short electrode portion Ad1 as above corresponds to a variant portion P2 of the capacitance waveform Wa.

When the operation knob 10 in the state (2) rotates further in the forward direction, the long electrode portion Ac1 starts making an entry into the second region and an entry area increases gradually. When the long electrode portion Ac1 is fully in the second region as in the state (3), the capacitance Ctr reaches a highest value H. An increase of the capacitance Ctr due to an amount of entry of the long electrode portion Ac1 as above corresponds to a variant portion P4 of the capacitance wave Wa. The length of the long electrode portion Ac1 in the radial rotational direction is longer than the length of the short electrode portion Ad1 in the radial rotational direction. Hence, an inclination of the variant portion P4 is greater than an inclination of the variant portion P2.

The capacitance Ctr remains invariant and is maintained at a constant value (i.e., highest value H) as in the state (4) even when the operation knob 10 rotates until the short electrode portion Ad1 starts making an exit from the second region. When the operation knob 10 in the state (4) rotates further in the forward direction, the short electrode portion Ad1 starts making an exit from the second region and the entry area of the short electrode portion Ad1 decreases gradually. When the entire short electrode portion Ad1 leaves from the second region as in the state (5), the capacitance Ctr decreases to a second intermediate value M2. A decrease of the capacitance Ctr due to an amount of exit of the short electrode portion Ad1 as above corresponds to a variant portion P6 of the capacitance waveform Wa.

When the operation knob 10 in the state (5) rotates further in the forward direction, the long electrode portion Ac1 starts making an exit from the second region and the entry area of the long electrode portion Ac1 decreases gradually. When the entire long electrode portion Ac1 leaves from the second region as in the state (6), the capacitance Ctr decreases to the lowest value L. A decrease of the capacitance Ctr due to an amount of exit of the long electrode portion Ac1 as above corresponds to a variant portion P8 of the capacitance waveform Wa. The length of the long electrode portion Ac1 in the radial rotational direction is longer than the length of the short electrode portion Ad1 in the radial rotational direction. Hence, an inclination of the variant portion P8 is greater than an inclination of the variant portion P6.

When the positional relation among the long electrode portion Ac1, the short electrode portion Ad1, and the second electrode portion B8 changes in order of (1) through (6) in the manner described above as the operation knob 10 rotates in the forward direction, the capacitance Ctr varies as follows. That is, after the capacitance Ctr is maintained at the lowest value L, the capacitance Ctr increases to the first intermediate value M1 and to the highest value H. An inclination of an increase from the lowest value L to the first intermediate value M1 is smaller than an inclination of an increase from the first intermediate value M1 to the highest value H.

Subsequently, after the capacitance Ctr is marinated at the highest value H, the capacitance Ctr decreases to the second intermediate value M2 and to the lowest value L. An inclination of a decrease from the highest value H to the second intermediate value M2 is smaller than an inclination of a decrease from the second intermediate value M2 to the lowest value L.

Hence, when the operation knob 10 rotates in the forward direction, the positional relation changes in order of (1) to (6) and invariant portions P1 and P5 and the variant portions P2, P4, P6, and P8 contained in the capacitance waveform W repeatedly appear in order as follows. That is, the appearance order is the invariant portion P1 (i.e., L), the variant portion P2 (i.e., small inclination), the variant portion P4 (i.e., large inclination), the invariant portion P5 (i.e., H), the variant portion P6 (i.e., small inclination), the variant portion P8 (i.e., large inclination), and the invariant portion P1 (i.e., L).

On the other hand, when the operation knob 10 rotates in the backward direction, the positional relation changes in order of (6) to (1) and the appearance order is as follows. That is, the appearance order is the invariant portion P1 (i.e., L), the variant portion P8 (i.e., large inclination), the variant portion P6 (i.e., small inclination), the invariant portion P5 (i.e., H), the variant portion P4 (i.e., large inclination), the variant portion P2 (i.e., small inclination), and the invariant portion P1 (i.e., L).

A microcomputer in an ECU 40 determines whether the variant portions P2, P4, P6, and P8 are appearing in the capacitance waveform W in addition to the invariant portions P1 and P5. A determination on the appearance of the variant portions P2, P4, P6, and P8 is made by computing an inclination of a change in the calculated capacitance Ctr.

The microcomputer further determines an order in which the invariant portions P1 (i.e., L) and P5 (i.e., H) and the variant portions P2 (i.e., small inclination), P4 (i.e., large inclination), P6 (i.e., small inclination), and P8 (i.e., large inclination) appear on the basis of a result of the appearance determination. When the determined order is L, small inclination, large inclination, H, small inclination, large inclination, and L, the microcomputer determines that the operation knob 10 is rotating in the forward direction. On the other hand, when the determined order is L, large inclination, small inclination, H, large inclination, small inclination, and L, the microcomputer determines that the operation knob 10 is rotating in the backward direction. The microcomputer making a determination on a rotational direction as above functions as rotational direction determination device 42.

Owing to the configuration as above, the present embodiment having the first electrodes each formed of a single electrode plate is also capable of detecting a rotational direction using the first electrodes A1 through A8 and the second electrodes B1 through B8 used to detect a rotational angle as in the first embodiment above.

Fourth Embodiment

Figure 10:
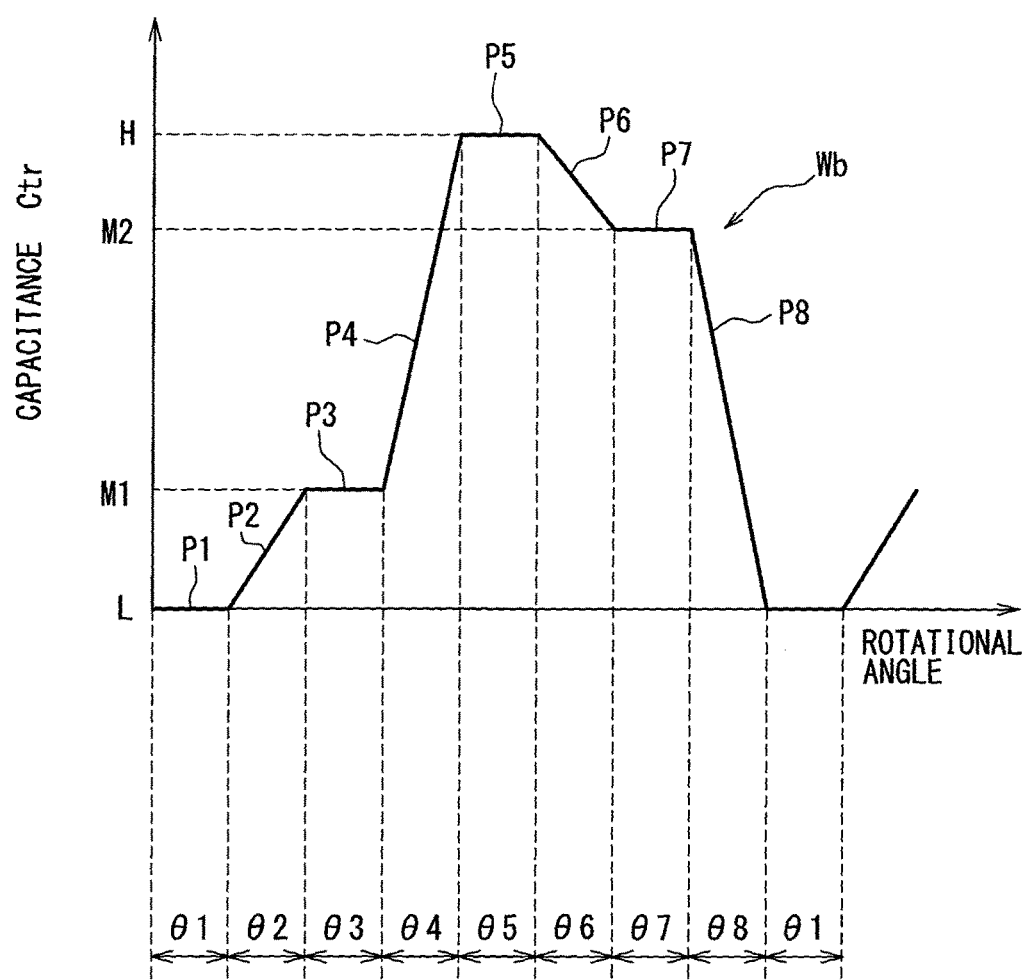
FIG. 10 is a view showing a capacitance waveform according to a fourth embodiment of the present disclosure.

The present embodiment is a modification of the first embodiment above. FIG. 10 shows a shape of a capacitance waveform Wb of the present embodiment. As is shown in the drawing, the capacitance waveform Wb is of a shape in which rotational angles θ1 through θ8 of an operation knob 10 corresponding to invariant and variant portions P1 through P8, respectively, are all equal. In other words, first electrodes A1 through A8 and second electrodes B1 through B8 are provided for the capacitance waveform Wb to be formed in the shape as above.

In the first embodiment above, the rotational angle calculation device 41 calculates an amount of the rotation operation on the basis of the number of appearances of the pulsating waveform Wp. On the contrary, the rotational angle calculation device 41 of the present embodiment calculates an amount of a rotation operation on the basis of the number of times the invariant and variant portions P1 through P8 change, that is, the number of appearances of the invariant and variant portions P1 through P8.

As has been described, according to the present embodiment, an amount of the rotation operation is calculated on the basis of the number of appearances of the invariant and variant portions P1 through P8 contained in a single pulsating waveform Wp. Hence, in comparison with a case where an amount of the rotation operation is calculated on the basis of the number of appearances of the pulsating waveform Wp, resolution of the calculation can be improved.

For example, in a case where the pulsating waveform Wp appears eight times while the operation knob 10 rotates once, that is, in a case where the pulsating waveform Wp appears in cycles each time the operation knob 10 rotates by 45 degrees, resolution by the method in the first embodiment above is 45 degrees. In contrast, because the eight invariant and variant portions P1 through P8 are contained in a single pulsating waveform Wp, the resolution is improved by eight times. More specifically, because the invariant and variant portions P1 through P8 appear 64 times while the operation knob 10 rotates once, resolution by the method of the present embodiment is 5.625 degrees.

Fifth Embodiment

In the first and second embodiments above, the first electrodes A1 through A4 belonging to the first group and the first electrodes A5 through A8 belonging to the second group are disposed on a same rotation trajectory. In contrast, first electrodes Ao belonging to a first group and first electrodes Ai belonging to a second group are disposed on rotation trajectories different from each other in the present embodiment.

A more detailed description will be given using FIG. 11. A rotating body 101 operated to rotate by a user is formed in a shape in which irregularities are provided to a metal annular member so as to have different lengths in a radial direction. Of the annular member, portions (i.e., shaded portions in the drawing) protruding radially outward function as the first electrodes Ao (hereinafter, referred to as the outer first electrodes Ao). The multiple outer first electrodes Ao belong to the first group and are aligned at regular intervals on a same rotation trajectory.

Also, of the annular member, portions (i.e., shaded portions in the drawing) protruding radially inward function as the first electrodes Ai (hereinafter, referred to as the inner first electrodes Ai). The multiple inner first electrodes Ai belong to the second group and are aligned at regular intervals on a same rotation trajectory. In short, two types of the first electrodes Ao and Ai are provided to the single rotating body 101. The multiple outer first electrodes Ao rotate on a rotation trajectory present on an outer peripheral surface of the rotating body 101, whereas the multiple inner first electrodes Ai rotate on a rotation trajectory present on an inner peripheral surface of the rotating body 101.

A supporting body 201 supporting the rotating body 101 in a rotatable manner has second electrodes Bo (hereinafter, referred to as the outer second electrode Bo) disposed oppositely to the outer first electrodes Ao and second electrodes Bi (hereinafter, referred to as the inner second electrodes Bi) disposed oppositely to the inner first electrodes Ai. The multiple outer second electrodes Bo belong to the first group and are aligned at regular intervals on a same rotation trajectory. The multiple inner second electrodes Bi belong to the second group and are aligned at regular intervals on a same rotation trajectory.

Figure 11:
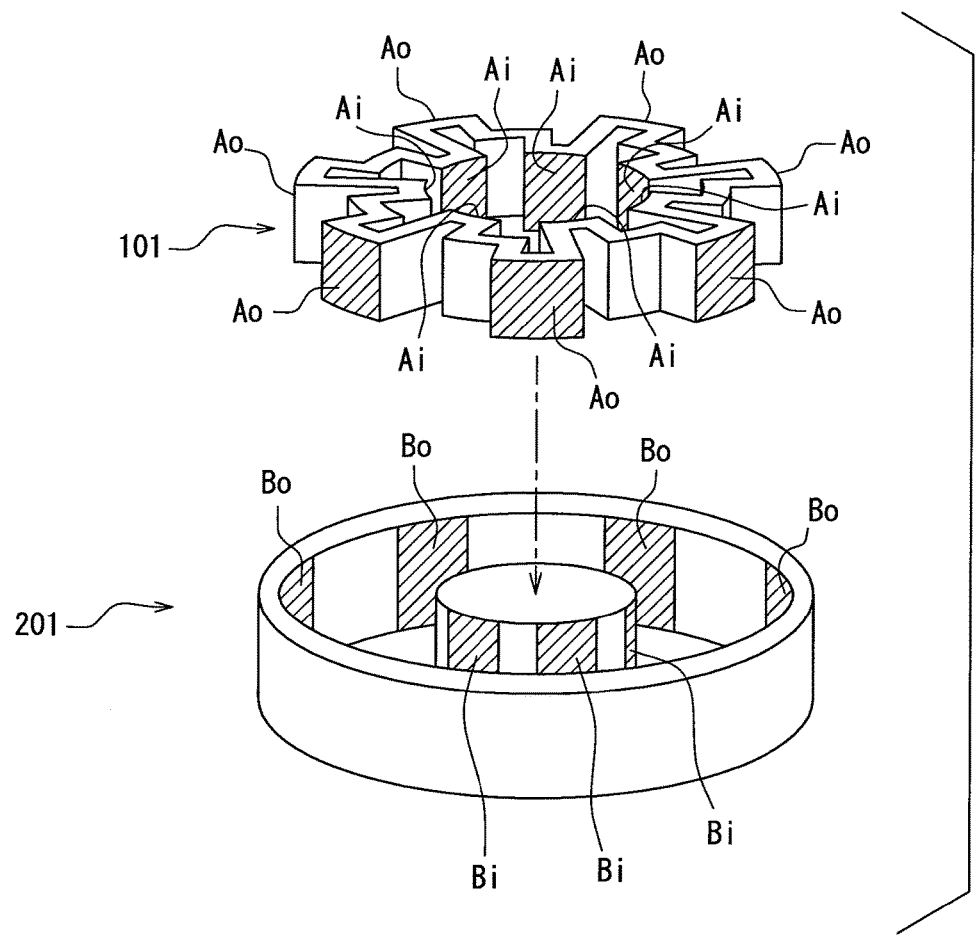
FIG. 11 is an exploded perspective view showing a configuration of a rotating body and a supporting body in a fifth embodiment of the present disclosure.

A portion of the supporting body 201 that supports the rotating body 101 is omitted in FIG. 11. Diagonal lines of FIG. 11 are to explicitly indicate positions of the electrodes Ao, Ai, Bo, and Bi and are not the hatching to indicate a cross section. Of the rotating body 101, intermediate portions present between the outer first electrodes Ao and the inner first electrodes Ai are sufficiently spaced apart from both of the outer second electrode Bo and the inner second electrode Bi. Accordingly, a capacitance generated between the intermediate portions and the second electrodes Bo and Bi is assumed to be zero.

In the first and second embodiments above, the first electrodes A1 through A4 of the first group and the first electrodes A5 through A8 of the second group are capable of forming the capacitors C1 through C8 with any of the second electrodes B1 through B8. In contrast, the present embodiment is configured in such a manner as shown in FIG. 13 through FIG. 16 that the outer first electrodes Ao form first capacitors C11 and C12 with the outer second electrodes Bo alone, and the inner first electrodes Ai form second capacitors C13 and C14 with the inner second electrodes Bi alone.

Figure 12:
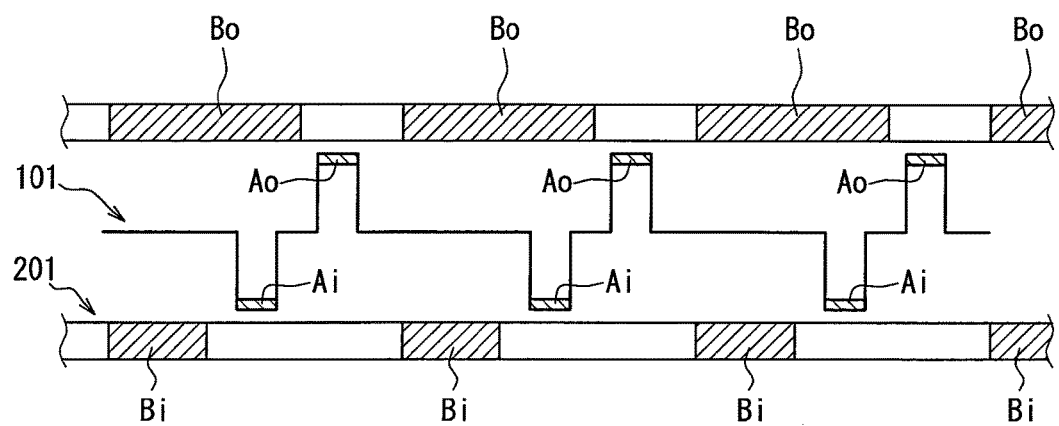
FIG. 12 is a view schematically showing a positional relation between first electrodes and second electrodes in the fifth embodiment.

FIG. 12 shows a case where the rotating body 101 is at a rotation position at which none of the outer first electrodes Ao and the inner first electrodes Ai opposes the second electrodes Bo and Bi, respectively. In such a case, none of the first capacitors C11 and C12 and the second capacitors C13 and C14 is formed.

As is shown in the drawing, an area of the outer second electrodes Bo is set to be smaller than an area of the inner second electrodes Bi. Also, the outer first electrodes Ao and the inner first electrodes Ai are disposed alternately in the rotational direction. An interval between the outer first electrodes Ao and the inner first electrodes Ai is set to two types of lengths: long and short. The outer first electrodes Ao and the inner first electrodes Ai are disposed for the long interval and the short interval to be repeated alternately.

Figure 13:
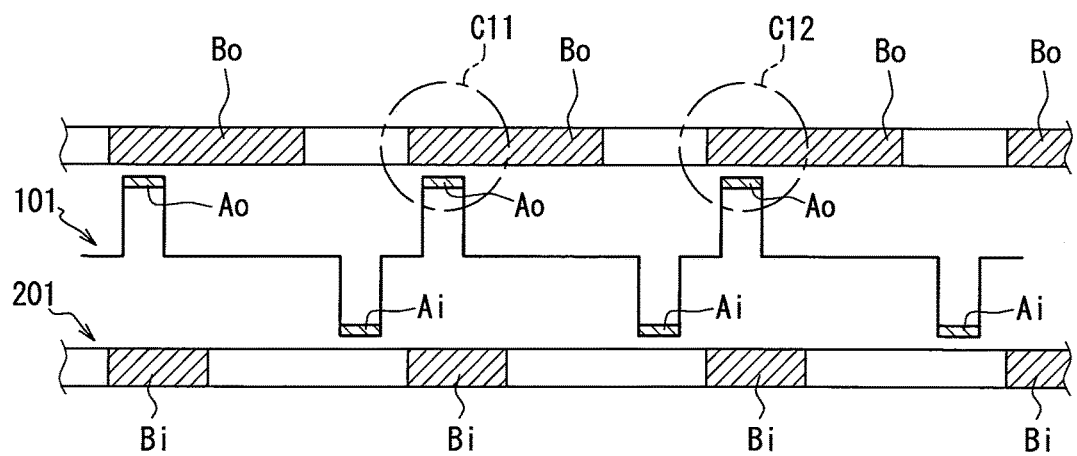
FIG. 13 is a view schematically showing another positional relation between the first electrodes and the second electrodes in the fifth embodiment.

FIG. 13 shows a case where the rotating body 101 in the state of FIG. 12 rotates in the forward direction. Herein, the outer first electrodes Ao oppose the outer second electrodes Bo whereas the inner first electrodes Ai do not oppose the inner second electrode Bi. Hence, the first capacitors C11 and C12 are formed whereas the second capacitors C13 and C14 are not formed.

Figure 14:
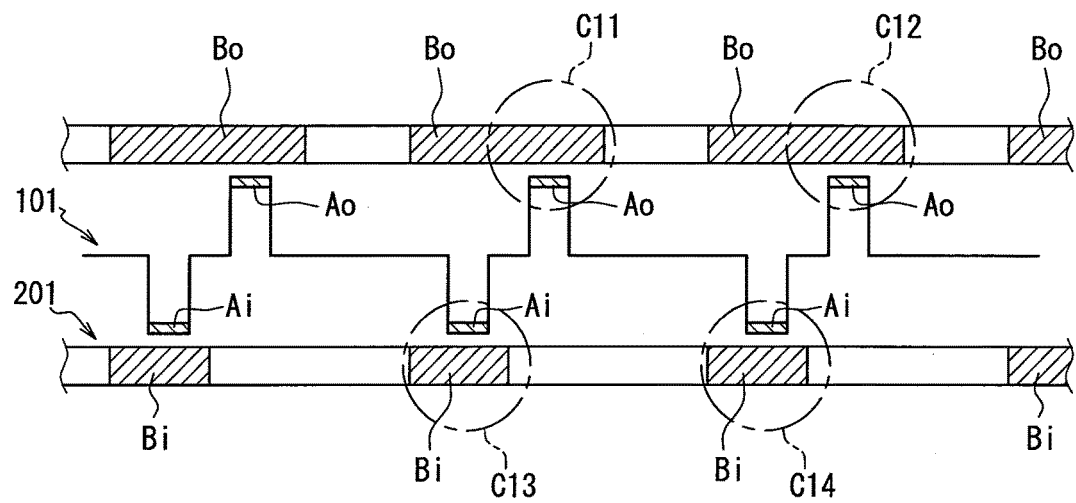
FIG. 14 is a view schematically showing still another positional relation between the first electrodes and the second electrodes in the fifth embodiment.

FIG. 14 shows a case where the rotating body 101 in the state of FIG. 13 rotates further in the forward direction. Herein, all of the outer first electrodes Ao and the inner first electrodes Ai oppose the outer second electrodes Bo and the inner second electrodes Bi, respectively. Hence, both of the first capacitors C11 and C12 and the second capacitors C13 and C14 are formed.

The outer first electrodes Ao and the inner first electrodes Ai are electrically connected. The outer second electrodes Bo and a third electrode D1 are electrically connected. The inner second electrode Bi and a third electrode D2 are electrically connected. Capacitors C9 and C10 formed of the third electrodes D1 and D2 and fourth electrodes E1 and E2 are electrically connected to a first terminal 40a and a second terminal 40b on the side of the fourth electrodes E1 and E2 in the same manner as in FIG. 5.

Figure 15:
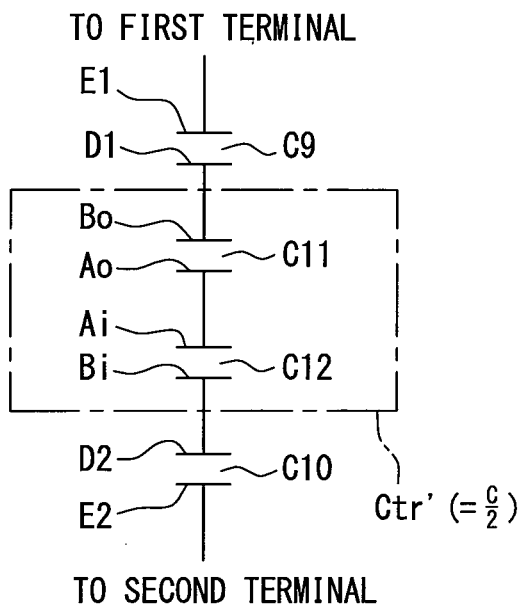
FIG. 15 is an equivalent circuit diagram of capacitors in the case of the positional relation shown in FIG. 13.

Accordingly, in a case where the first capacitors C11 and C12 are formed as in FIG. 13, the first capacitors C11 and C12 are connected to the other capacitors C9 and C10 in series as shown in FIG. 15. The multiple first capacitors C11 and C12 are interconnected in series.

Figure 16:
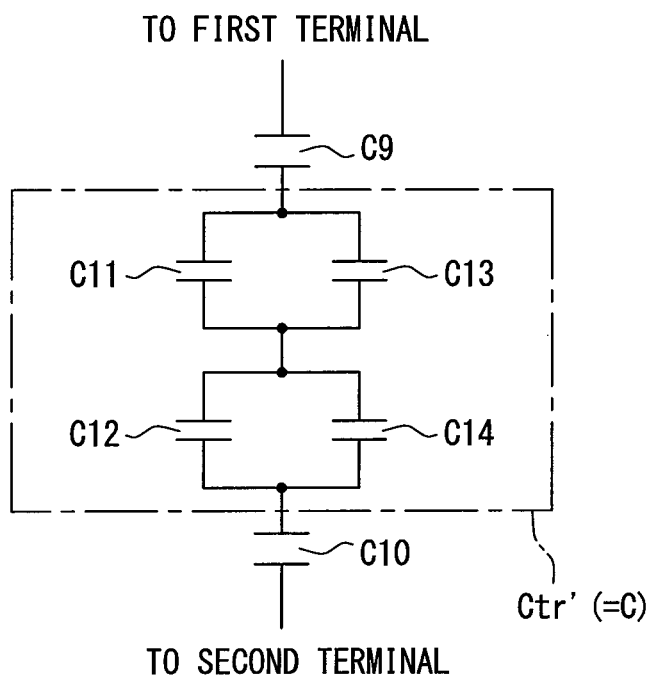
FIG. 16 is an equivalent circuit diagram of capacitors in the case of the positional relation shown in FIG. 14.

In a case where the first capacitors C11 and C12 and the second capacitors C13 and C14 are formed as shown in FIG. 14, the capacitors C11, C12, C13, and C14 are connected to the other capacitors C9 and C10 in series as shown in FIG. 16. The multiple first capacitors C11 and C12 are interconnected in series and the multiple second capacitors C13 and C14 are interconnected in series. The first capacitors C11 and C12 and the second capacitors C13 and C14 are connected, respectively, in parallel.

All of the multiple first capacitors C11 and C12 and the multiple second capacitors C13 and C14 have equal capacitances C. Hence, a synthetic capacitance Ctr' of the first capacitors C11 and C12 shown in FIG. 13 and FIG. 15 is found as: $1/(1/C+1/C)=C/2$. A synthetic capacitance Ctr' of the first capacitors C11 and C12 and the second capacitors C13 and C14 shown in FIG. 14 and FIG. 16 is found as: $1/(1/2C+1/2C)=C$. In the case of FIG. 12, it can be said that a synthetic capacitance Ctr' of the first capacitors C11 and C12 and the second capacitors C13 and C14 is zero.

Figure 17:
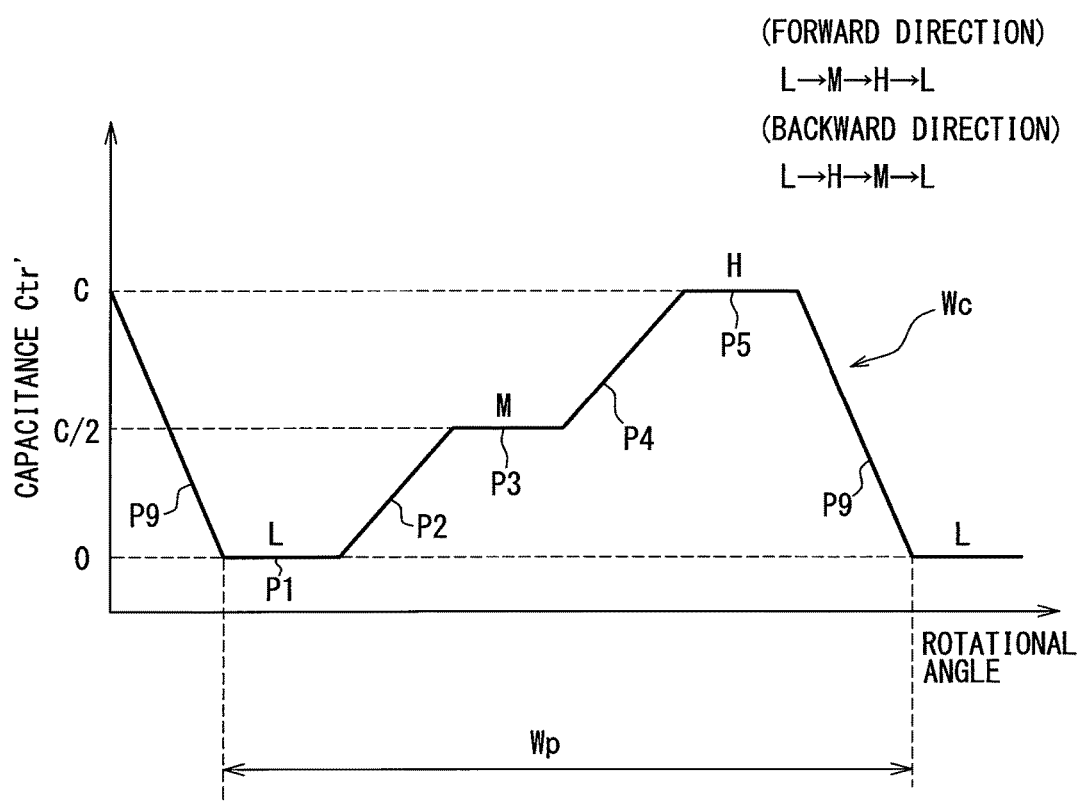
FIG. 17 is a view showing a capacitance waveform according to the fifth embodiment.

FIG. 17 shows a capacitance waveform Wc representing a change in the capacitance Ctr' corresponding to a rotational angle of the operation knob 10. A capacitance detected by a microcomputer in an ECU 40 is a capacitance which is the synthetic capacitance Ctr' synthesized with capacitances of the capacitors C9 and C10. Hereinafter, a shape of the capacitance waveform Wc will be described in detail.

In the state of FIG. 12, none of the outer first electrodes Ao and the inner first electrodes Ai is in a region opposing the outer second electrodes Bo (hereinafter, referred to as the outer second region) and a region opposing the inner second electrodes Bi (hereinafter, referred to as the inner second region), respectively. Hence, the capacitance Ctr' is at a minimum value (i.e., lowest value L=0). When the operation knob 10 in the state of FIG. 12 rotates in the forward direction, the outer second electrodes Bo make an entry into the outer second region and an entry area increases gradually. When the outer second electrodes Bo are fully in the outer second region as in the state of FIG. 13, the capacitance Ctr' increases to an intermediate value M (i.e., =C/2).

The capacitance Ctr' remains invariant and is maintained at a constant value (i.e., intermediate value M) even when the operation knob 10 rotates in the forward direction until the inner first electrodes Ai start making an entry into the inner second region. When the operation knob 10 rotates further in the forward direction, the inner first electrodes Ai start making an entry into the inner second region and an entry area increases gradually. When the inner first electrodes Ai are fully in the inner second region as in the state of FIG. 14, the capacitance Ctr' reaches a maximum value (i.e., highest value H=C).

The capacitance Ctr' remains invariant and is maintained at a constant value (i.e., highest value H) even when the operation knob 10 rotates until the outer first electrodes Ao start making an exit from the outer second region. When the operation knob 10 rotates further in the forward direction, the outer first electrodes Ao start making an exit from the outer second region and an entry area of the outer first electrode Ao decreases gradually. When the entire outer first electrodes Ao leave from the outer second region, the capacitance Ctr' decreases to the lowest value L.

When the positional relation between the first electrodes Ao and Ai and the second electrodes Bo and Bi changes in order of FIG. 12 to FIG. 14 in the manner described above as the operation knob 10 rotates in the forward direction, the capacitance Ctr' varies as follows. That is, the capacitance Ctr' increases to the intermediate value M after maintained at the lowest value L and increases to the highest value H after maintained at the intermediate value M. Subsequently, the capacitance Ctr' decreases to the lowest value L after maintained at the highest value H.

Hence, a pulsating waveform Wp, which increases from the lowest value L to the highest value H and decreases again to the lowest value L, appears in the capacitance waveform We while any of the multiple first electrodes Ao and Ai passes across the multiple second electrodes Bo and Bi. Also, invariant portions P1, P3, and P5 during which the capacitance Ctr' is maintained at three types of different constant values (i.e., lowest value L, intermediate value M, and highest value H) appear in a single pulsating waveform Wp. Of the pulsating waveform Wp, portions during which the capacitance Ctr' increases or decreases between adjacent two of the invariant portions P1, P3, and P5 are referred to as variant portions P2, P4, and P9.

The positional relation changes in order of FIG. 12, FIG. 13, and FIG. 14 when the operation knob 10 rotates in the forward direction, and the three types of the constant values contained in the capacitance waveform Wc repeatedly appear in order of the lowest value L, the intermediate value M, the highest value H, and the lowest value L. On the other hand, the positional relation changes in order of FIG. 14, FIG. 13, and FIG. 12 when the operation knob 10 rotates in the backward direction, and the three types of the constant values contained in the capacitance waveform Wc repeatedly appear in order of the lowest value L, the intermediate value M, the highest value H, and the lowest value L. In short, in contrast to the first and second embodiments above in which four types of the invariant portions P1, P3, P5, and P7 appear, three types of the invariant portions P1, P3, and P5 appear in the present embodiment.

The microcomputer in the ECU 40 determines whether the invariant portions P1, P3, and P5 are appearing in the capacitance waveform Wc. When the appearance of the invariant portions P1, P3, and P5 is determined, the microcomputer (i.e., rotational angle calculation device 41) counts the number of the appearing pulsating waveforms Wp and calculates an amount of the rotation operation on the operation knob 10 on the basis of the count number.

Further, the microcomputer (i.e., rotational direction determination device 42) determines an order in which the three types of the invariant portions P1, P3, and P5 appear on the basis of a result of the appearance determination of the invariant portions P1, P3, and P5 as above. When the determined order is the order of the lowest value L, the intermediate value M, the highest value H, and the lowest value L, the microcomputer determines that the operation knob 10 is rotating in the forward direction. On the other hand, when the determined order is the order of the lowest value L, the highest value H, the intermediate value M, and the lowest value L, the microcomputer determines that the operation knob 10 is rotating in the backward direction.

As has been described, in the present embodiment, the outer first electrodes Ao belonging to the first group and the inner first electrodes Ai belonging to the second group are disposed on rotation trajectories different from each other. The outer first electrodes Ao and the outer second electrode Bo form the first capacitors C11 and C12. The inner first electrodes Ai and the inner second electrodes Bi form the second capacitors C13 and C14. It is characterized in that the capacitance waveform We used in the rotational direction determination device 42 to determine a rotational direction is a waveform representing a change in the synthetic capacitance of the first capacitors and the second capacitors.

In the first embodiment above, in order to make an order in which the invariant portions P1, P3, P5, and P7 appear different in the forward rotation and the backward rotation, four types of the invariant portions P1, P3, P5, and P7 are required. On the contrary, because the outer first electrodes Ao and the inner first electrodes Ai are disposed on different rotation trajectories in the present embodiment, it can be configured in such a manner that only three types of the invariant portions P1, P3, and P5 are used to make the order in which the invariant portions P1, P3, and P5 appear different in the forward rotation and the backward rotation. Accordingly, values of the capacitance in the respective invariant portions P1, P3, and P5 can be made different noticeably from one another. Hence, when a determination is made as to whether the invariant portions P1, P3, and P5 are appearing, determination accuracy can be improved.

Sixth Embodiment

Figure 18:
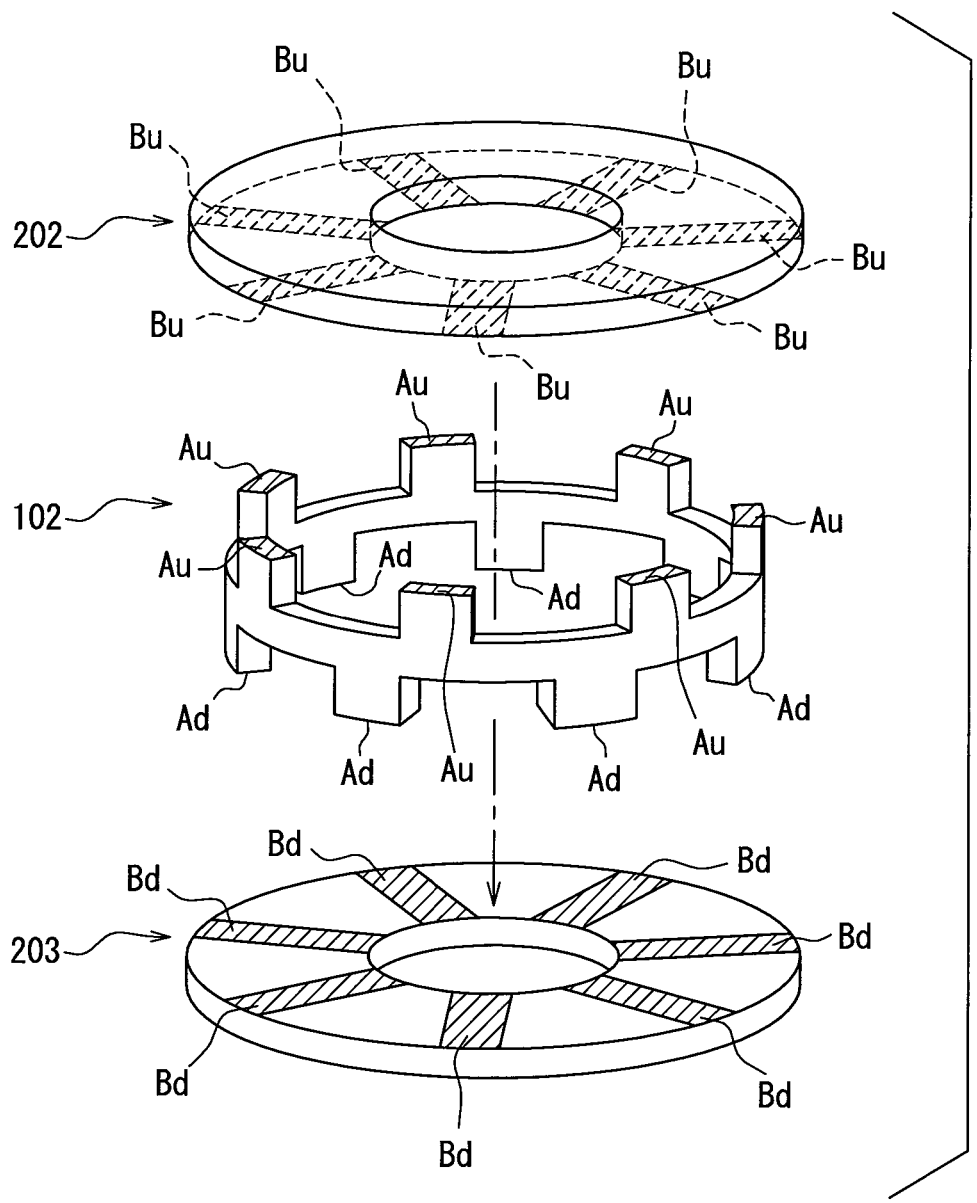
FIG. 18 is an exploded perspective view showing a configuration of a rotating body and a supporting body in a sixth embodiment of the present disclosure.

In the fifth embodiment above, by disposing the outer first electrodes Ao belonging to the first group and the inner first electrodes Ai belonging to the second group to different positions in the radial rotational direction, the outer first electrodes Ao and the inner first electrodes Ai are positioned on rotation trajectories different from each other. In contrast, the present embodiment is configured in such a manner as shown in FIG. 18 that first electrodes Au (hereinafter, referred to as the upper first electrodes Au) belonging to a first group and first electrodes Ad (hereinafter, referred to as the lower first electrodes Ad) belonging to a second group are disposed at positions different in a direction of a rotation axis. When configured as above, the upper first electrodes Au and the lower first electrodes Ad are displaced in the direction of the rotation axis and positioned on rotation trajectories different from each other.

A detailed description will be given using FIG. 18. A rotating body 102 operated to rotate by a user is formed in a shape in which irregularities are provided to a metal annular member so as to have different lengths in a Z-axis direction. Of the annular member, portions (i.e., shaded portion in the drawing) protruding upward in the Z-axis direction (i.e., toward the user) function as the first electrodes Au (hereinafter, referred to as the upper first electrodes Au). The multiple upper first electrodes Au belong to the first group and are aligned at regular intervals on a same rotation trajectory.

Of the annular member, portions (i.e., shaded portions in the drawing) protruding downward in the Z-axis direction function as the first electrodes Ad (hereinafter, referred to as the lower first electrodes Ad). The multiple lower first electrodes Ad belong to the second group and are aligned at regular intervals on a same rotation trajectory. In short, two types of the first electrodes Au and Ad are provided to the single rotating body 102. A position in the radial rotational direction of the rotation trajectory by the upper first electrodes Au falls on a position in the radial rotational direction of the rotation trajectory by the lower first electrodes Ad.

Supporting bodies 202 and 203 supporting the rotating body 102 in a rotatable manner have second electrodes Bu (hereinafter, referred to as the upper second electrodes Bu) disposed oppositely to the upper first electrodes Au and second electrodes Bd (hereinafter, referred to as the lower second electrodes Bd) disposed oppositely to the lower first electrodes Ad, respectively. The multiple upper second electrodes Bu belong to the first group and are aligned at regular intervals on a same rotation trajectory. The multiple lower second electrodes Bd belong to the second group and are aligned at regular intervals on a same rotation trajectory.

Portions of the supporting bodies 202 and 203 that support the rotating body 102 are omitted in FIG. 18. Diagonal lines of FIG. 18 are to explicitly indicate positions of the electrodes Au, Ad, Bu, and Bd and are not the hatching to show a cross section. Of the rotating body 102, intermediate portions present between the upper first electrodes Au and the lower first electrodes Ad are sufficiently spaced apart from both of the upper second electrode Bu and the lower second electrode Bd. Hence, a capacitance generated between the intermediate portions and the second electrodes Bu and Bd is assumed to be zero.

In the present embodiment, the upper first electrodes Au form first capacitors with the upper second electrodes Bu and the lower first electrodes Ad form second capacitors with the lower second electrodes Bd. A capacitance waveform by the first and second capacitors is of the same shape as the waveform shown in FIG. 17 of the fifth embodiment above. Hence, the present embodiment can be configured in such a manner that only three types of invariant portions P1, P3, and P5 are used to make the order in which the invariant portions P1, P3, and P5 appear different in forward rotation and backward rotation as in the fifth embodiment above.

(Modifications)

The present disclosure is not limited to the contents described in the embodiments above and may be changed as described below. Also, characteristic configurations of the respective embodiments may be combined arbitrarily.

The microcomputer used in the respective embodiments calculates an amount of the rotation operation and determines a rotational direction. However, in addition to the processing as above, the microcomputer may calculate a rotation speed of the rotating body 10, 101, or 102.

In the first embodiment above, each of the first electrodes A1 through A8 is formed by electrically connecting two types of the electrodes Aa1 and Ab1 having different areas. Alternatively, the first electrodes A1 through A8 may be changed to the second electrodes B1 through B8 and the second electrodes B1 through B8 may be formed by electrically connecting two types of electrodes having different areas.

In the fifth embodiment and the sixth embodiment above, as are shown in FIG. 15 and FIG. 16, the first capacitors C11 and C12 and the second capacitors C13 and C14 are connected in parallel. Alternatively, the first capacitors C11 and C12 and the second capacitors C13 and C14 may be connected in series.

A pushing force toward the reference position in the rotational direction R is conferred to the rotating bodies 10, 101, and 102 of the respective embodiments above. However, the configuration to confer the pushing force may be omitted and it may be configured instead in such a manner that the rotating bodies 10, 101, and 102 do not return to the reference position even when the user moves his hand off the rotating bodies 10, 101, and 102.

A pushing force toward the reference position in the rotational direction R is conferred to the rotating bodies 10, 101, and 102 of the respective embodiments above. Also, a pushing force toward the reference position in the swing directions X and Y is conferred to the supporting body 20 in the respective embodiments above. However, the configuration to confer the pushing forces may be omitted and it may be configured instead in such a manner that the rotating bodies 10, 101, and 102 do not return to the reference position even when the user moves his hand off the rotating bodies 10, 101, and 102.

In the fifth embodiment above, by providing the irregularities to the metal annular member so as to have different lengths in the radial direction, a part of the annular member is made to function as the outer first electrodes Ao and the inner first electrodes Ai. Alternatively, it may be configured in such a manner that a function same as the function of the rotating body 101 shown in FIG. 11 is exerted by attaching the outer first electrodes Ao and the inner first electrodes Ai at predetermined positions on a resin annular member.

In the sixth embodiment above, by providing the irregularities to the metal annular member so as to have different lengths in the axial direction, a part of the annular member is made to function as the upper first electrodes Au and the lower first electrodes Ad. Alternatively, it may be configured in such a manner that a function same as the function of the rotating body 102 shown in FIG. 18 is exerted by attaching the upper first electrodes Ao and the lower first electrodes Ad at predetermined positions on a resin annular member.

What is claimed is:

1. A rotation state detection device applied to an operation device having a rotating body that rotates in response to an input of an operation force, and a supporting body that supports the rotating body rotatably, comprising:
   at least one first electrode arranged at the rotating body;
   at least one second electrode arranged at the supporting body and generating a capacitance with the first electrode,
   wherein the at least one first electrode and the at least one second electrode are arranged to vary the capacitance periodically each time the rotating body rotates by a predetermined angle, and make a shape of a capacitance waveform representing a change in the capacitance to be different between a situation in which the rotating body rotates forward and a situation in which the rotating body rotates backward;

the rotation state detection device further comprising:
a rotational angle calculation device that calculates a rotational angle of the rotating body based on the number of periodic times the capacitance varies; and
a rotational direction determination device that carries out a determination on a rotational direction of the rotating body based on the shape of the capacitance waveform.

2. The rotation state detection device according to claim 1,
wherein the at least one first electrode includes a plurality of first electrodes,
wherein the at least one second electrode includes a plurality of second electrodes, and
wherein the plurality of first electrodes and the plurality of second electrodes are aligned in the rotational direction of the rotating body.

3. The rotation state detection device according to claim 2,
wherein the plurality of second electrodes are divided to a first group and a second group,
wherein a first capacitor configured by one part of the plurality of second electrodes belonging to the first group and a second capacitor configured by an other part of the plurality of second electrodes belonging to the second group are connected in series, and
wherein the capacitance waveform used for the determination is a waveform representing a change in a synthetic capacitance of the first capacitor and the second capacitor.

4. The rotation state detection device according to claim 2,
wherein the plurality of second electrodes are divided to a first group and a second group,
wherein a first capacitor configured by one part of the plurality of second electrodes belonging to the first group and a second capacitor configured by an other part of the plurality of second electrodes belonging to the second group are connected in parallel, and
wherein the capacitance waveform used for the determination is a waveform representing a change in a synthetic capacitance of the first capacitor and the second capacitor.

5. The rotation state detection device according to claim 2,
wherein the plurality of first electrodes and the plurality of second electrodes are divided to a first group and a second group, respectively,
wherein one part of the plurality of first electrodes belonging to the first group and an other part of the plurality of first electrodes belonging to the second group are arranged at rotation trajectories different from each other,
wherein the one part of the plurality of first electrodes and one part of the plurality of second electrodes belonging to the first group are arranged oppositely to each other to configure a first capacitor,
wherein the other part of the plurality of first electrodes and an other part of the plurality of second electrodes belonging to the second group are arranged oppositely to each other to configure a second capacitor, and
wherein the capacitance waveform used for the determination is a waveform representing a change in a synthetic capacitance of the first capacitor and the second capacitor.

6. The rotation state detection device according to claim 1,
wherein the capacitance waveform includes at least three types of invariant portions in each of which the capacitance remains invariant and is maintained at a constant value even if the rotating body rotates, and the constant value in each of the at least three types of the invariant portions is set to a different value, and
wherein the rotational direction determination device carries out the determination on the rotational direction based on an order in which the at least three types of the invariant portions appear.

7. The rotation state detection device according to claim 6,
wherein one of the at least one first electrode and the at least one second electrode is configured by electrically connecting two types of electrodes having different areas, and
wherein the two types of the electrodes are aligned at a predetermined interval apart in the rotational direction.

8. The rotation state detection device according to claim 6, wherein:
wherein the capacitance waveform includes portions other than the invariant portions that are referred to as variant portions, and rotational angles of the rotating body corresponding to the invariant portions and the variant portions respectively are all identical.

9. The rotation state detection device according to claim 1,
wherein the operation device includes a base member that holds the supporting body movably, and
wherein the rotation state detection device further comprises:
a plurality of third electrodes arranged at the supporting body, to which a signal indicative of the capacitance waveform outputted from the at least one second electrode or the at least one first electrode is inputted; and
at least one fourth electrode arranged at the base member and generating a capacitance with each of the plurality of third electrodes, and
wherein the rotational direction determination device carries out the determination on the rotational direction of the rotating body based on a signal outputted from the at least one fourth electrode.

* * * * *